United States Patent
Yoo et al.

(10) Patent No.: US 11,312,611 B2
(45) Date of Patent: Apr. 26, 2022

(54) HYDROGEN WATER GENERATOR

(71) Applicant: LG ELECTRONICS INC., Seoul (KR)

(72) Inventors: Hyun Sun Yoo, Seoul (KR); Jae Hung Chun, Seoul (KR); Joo Gyeom Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 16/692,408

(22) Filed: Nov. 22, 2019

(65) Prior Publication Data

US 2020/0361759 A1 Nov. 19, 2020

(30) Foreign Application Priority Data

May 13, 2019 (KR) .................. 10-2019-0055936
Jul. 10, 2019 (KR) .................. 10-2019-0083238

(51) Int. Cl.
 B67D 1/08 (2006.01)
 B01F 3/04 (2006.01)
 B67D 1/00 (2006.01)

(52) U.S. Cl.
 CPC ........ B67D 1/0894 (2013.01); B01F 3/04808 (2013.01); B67D 1/0004 (2013.01); *B01F 2003/04914* (2013.01); *B01F 2215/008* (2013.01); *B01F 2215/0052* (2013.01); *B67D 2210/00144* (2013.01)

(58) Field of Classification Search
 CPC ........... B67D 1/0894; B67D 1/0004; B67D 2210/00144; B67D 3/0009; B01F 3/04808; B01F 2003/04914; B01F 2215/0052; B01F 2215/008; F25D 23/126; B65G 15/58; B65G 17/46; B65G 27/24; B65G 54/02; B65G 2811/0668; A47J 31/00
 See application file for complete search history.

(56) References Cited

U.S. PATENT DOCUMENTS 2,217,514 A * 10/1940 Henry ............... B43L 25/00
                                                    220/628
4,045,738 A *  8/1977 Buzzell .............. G01P 3/488
                                                    324/174
4,523,083 A *  6/1985 Hamilton .......... A47J 36/2461
                                                    206/818

(Continued)

FOREIGN PATENT DOCUMENTS

CN    103306945 A    9/2013
CN    106892489 A    6/2017

(Continued)

*Primary Examiner* — Andrew D St.Clair
(74) *Attorney, Agent, or Firm* — Dentons US LLP

(57) ABSTRACT

A hydrogen water generator includes a hydrogen water discharger including a water outlet, a seating unit disposed under the water outlet and forming a seating surface, a water container seatable on the seating surface and including an opening at an upper end of the water container, and a first magnetic body at a lower end of the water container, and the seating unit including a second magnetic body. When the water container is seated on the seating surface, the first magnetic body and the second magnetic body are attractable to each other to position the water container with respect to the water outlet.

18 Claims, 41 Drawing Sheets

(56) References Cited

U.S. PATENT DOCUMENTS

| | | | | |
|---|---|---|---|---|
| 4,800,935 | A | * | 1/1989 | Buchser .................. B67D 1/08 |
| | | | | 141/362 |
| 10,292,514 | B1 | * | 5/2019 | Kuhn ........................ F16B 1/00 |
| 2011/0259757 | A1 | | 10/2011 | Vancina |
| 2013/0059049 | A1 | | 3/2013 | Zhang et al. |
| 2013/0139927 | A1 | * | 6/2013 | Jungclaus ............... A47J 31/58 |
| | | | | 141/98 |
| 2013/0327353 | A1 | * | 12/2013 | Field ........................ B08B 7/00 |
| | | | | 134/1 |
| 2015/0201795 | A1 | * | 7/2015 | Tinkler ............... A47J 31/5253 |
| | | | | 426/231 |
| 2017/0174538 | A1 | * | 6/2017 | Lelah ................... B67D 3/0038 |
| 2018/0067141 | A1 | * | 3/2018 | Mahmudimanesh .. G01N 35/04 |
| 2018/0255948 | A1 | * | 9/2018 | Fritz ..................... B65D 1/265 |

FOREIGN PATENT DOCUMENTS

| | | |
|---|---|---|
| CN | 107687000 A | 2/2018 |
| CN | 207699270 U | 8/2018 |
| JP | 2017069531 A | 4/2017 |
| KR | 10-1742948 B | 5/2017 |
| KR | 10-1795735 B | 11/2017 |
| KR | 10-1883864 B | 7/2018 |
| KR | 20190030836 A | 3/2019 |
| WO | 2018084368 A1 | 5/2018 |

* cited by examiner

[Fig. 1]
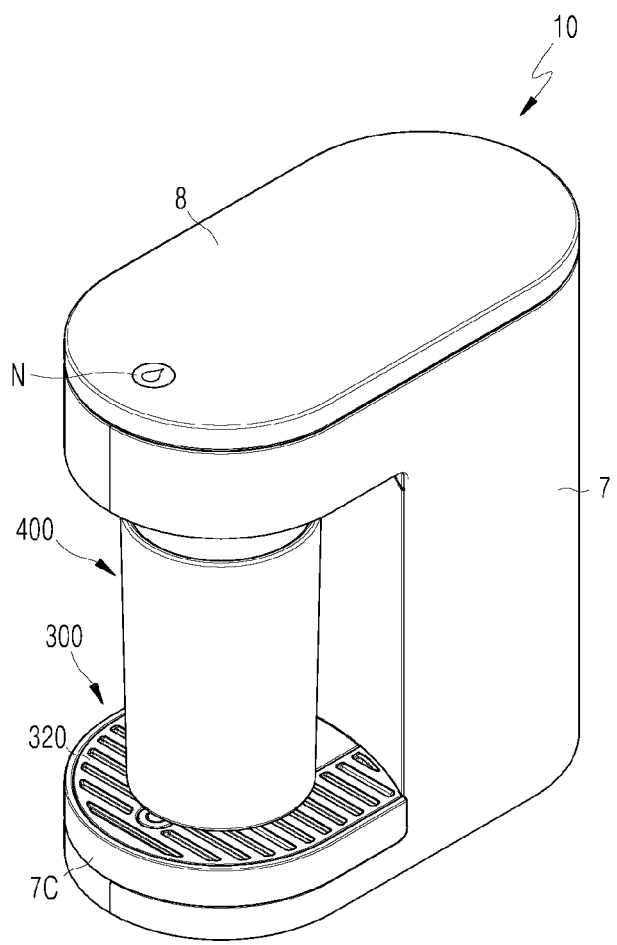

[Fig. 2A]
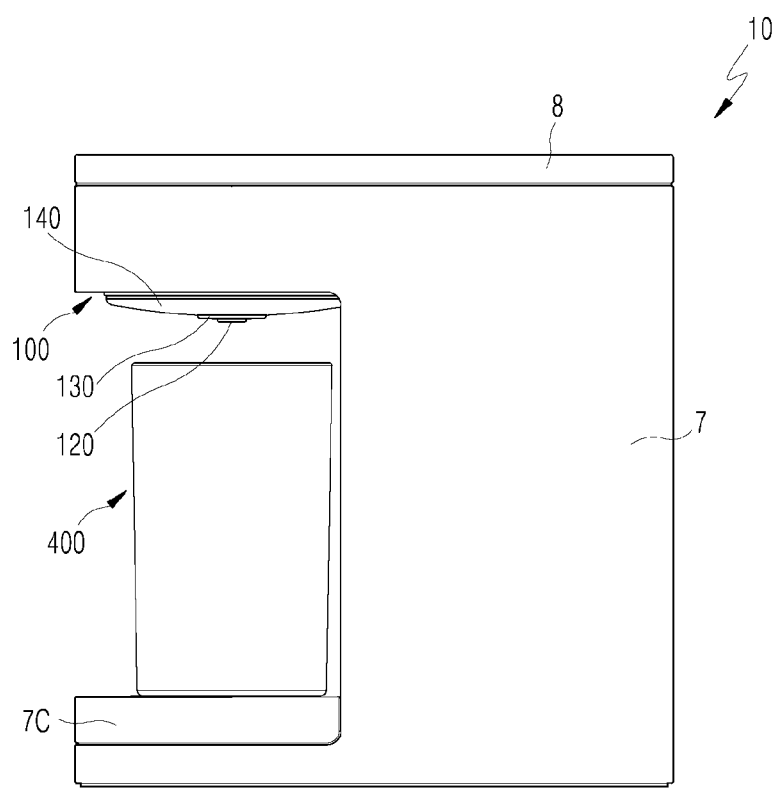

【Fig. 2B】
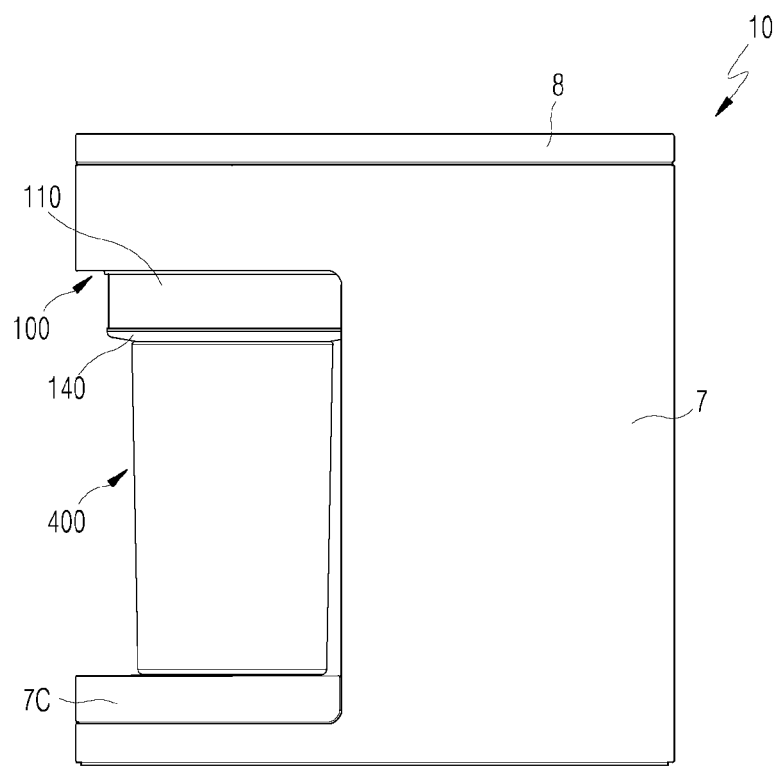

【Fig. 3A】
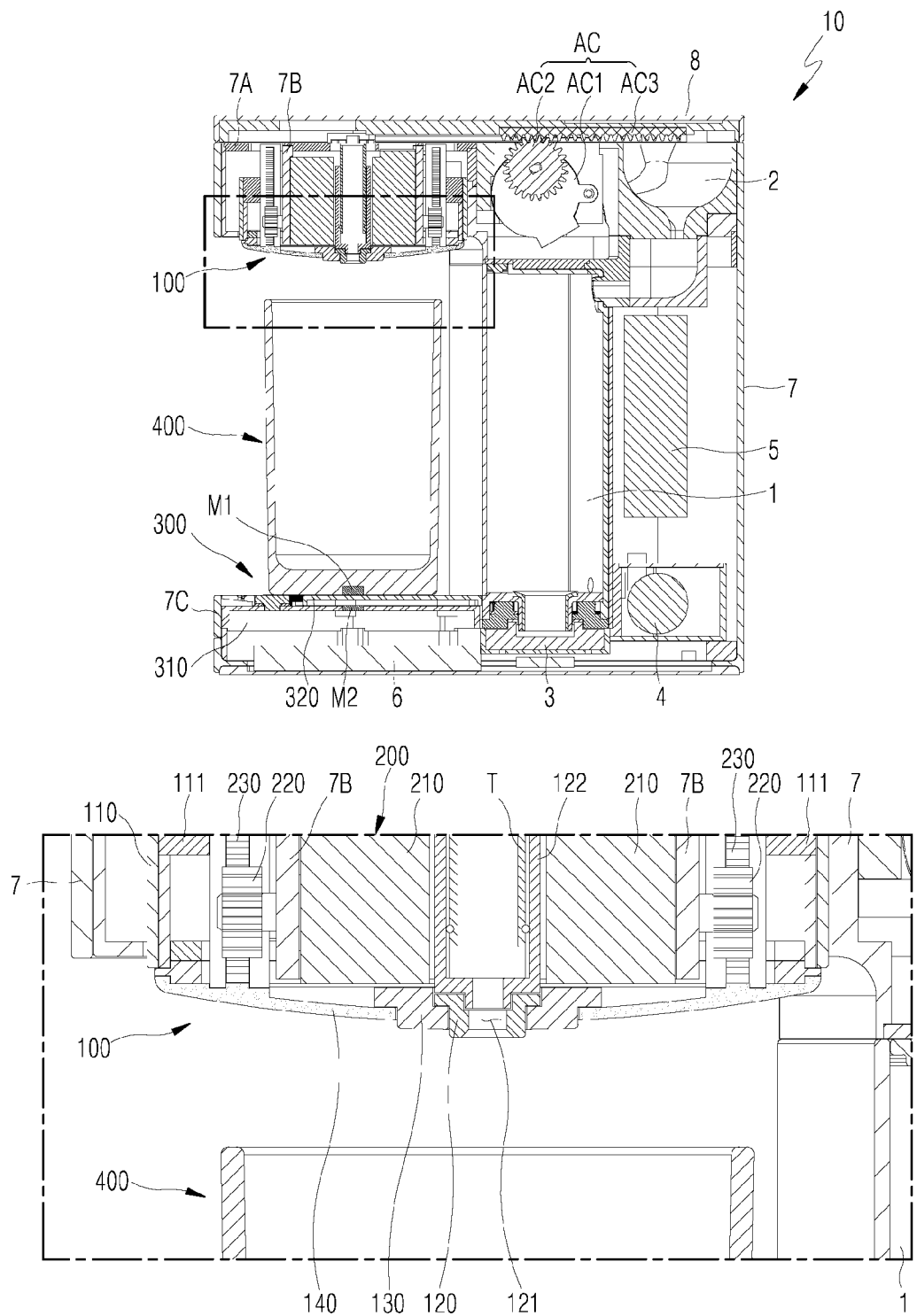

【Fig. 3B】
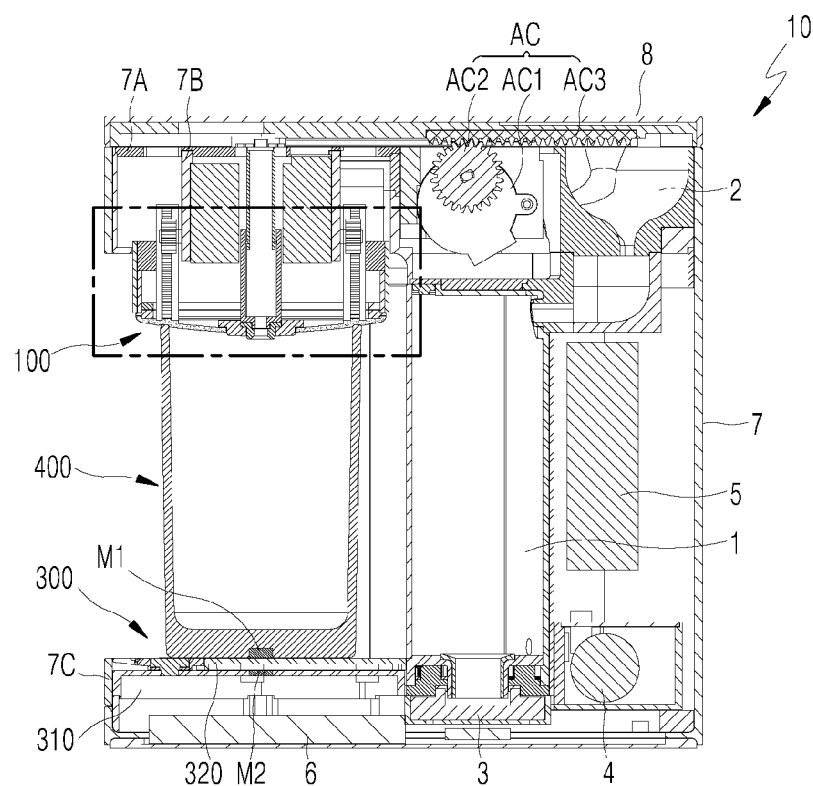
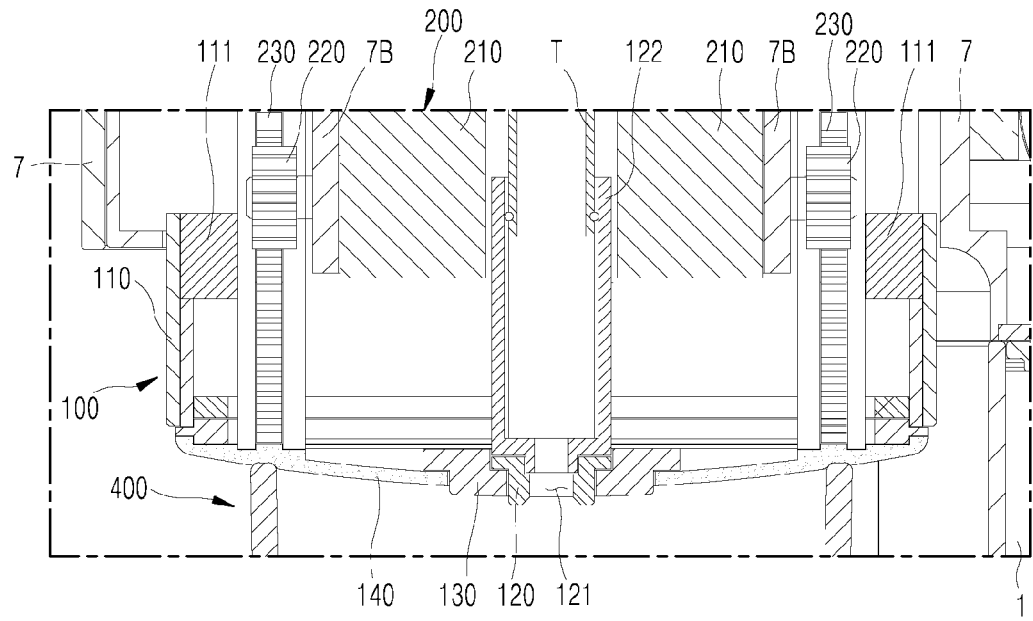

[Fig. 4]
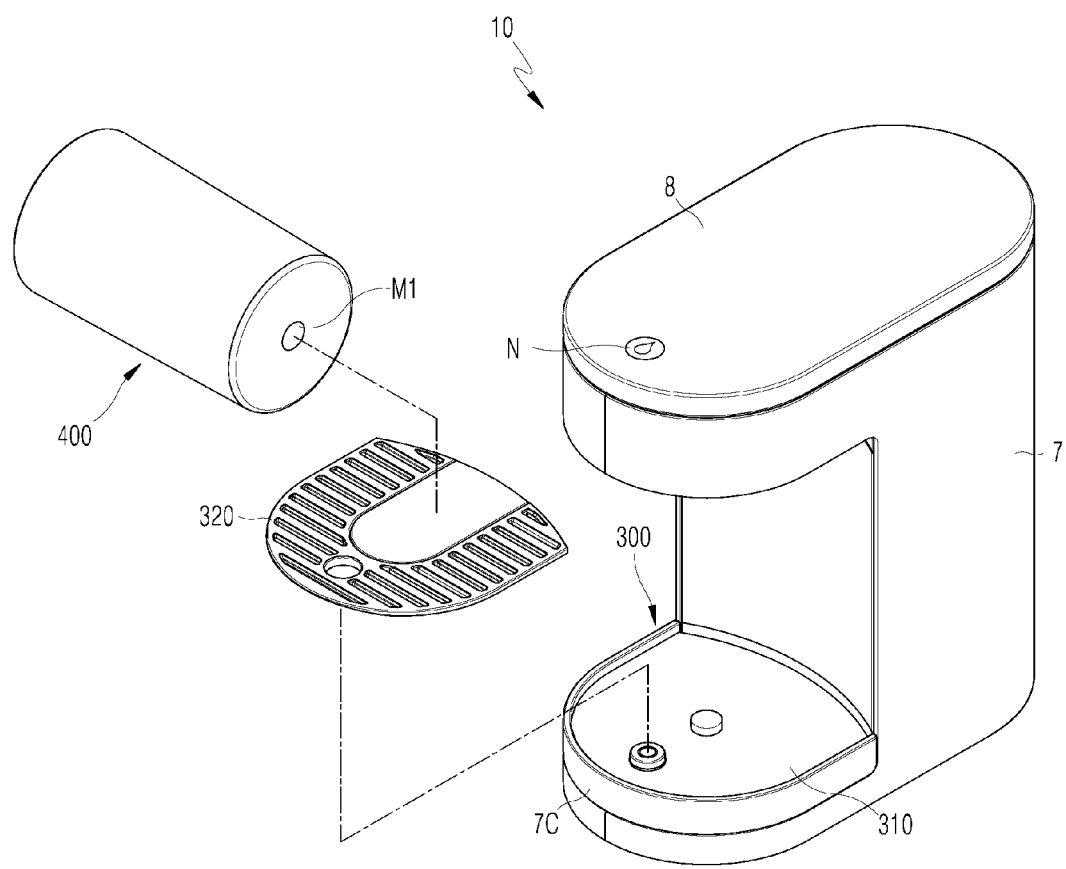

[Fig. 5]
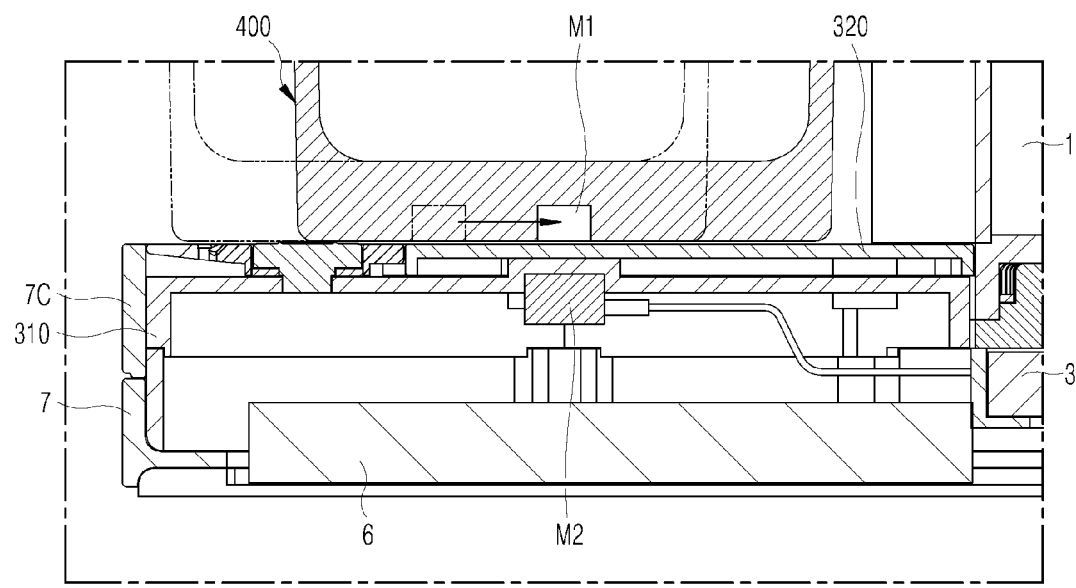

[Fig. 6]
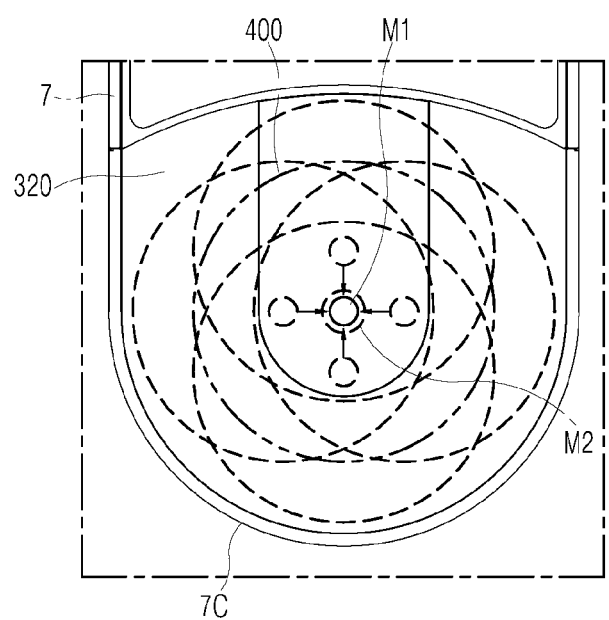

[Fig. 7]
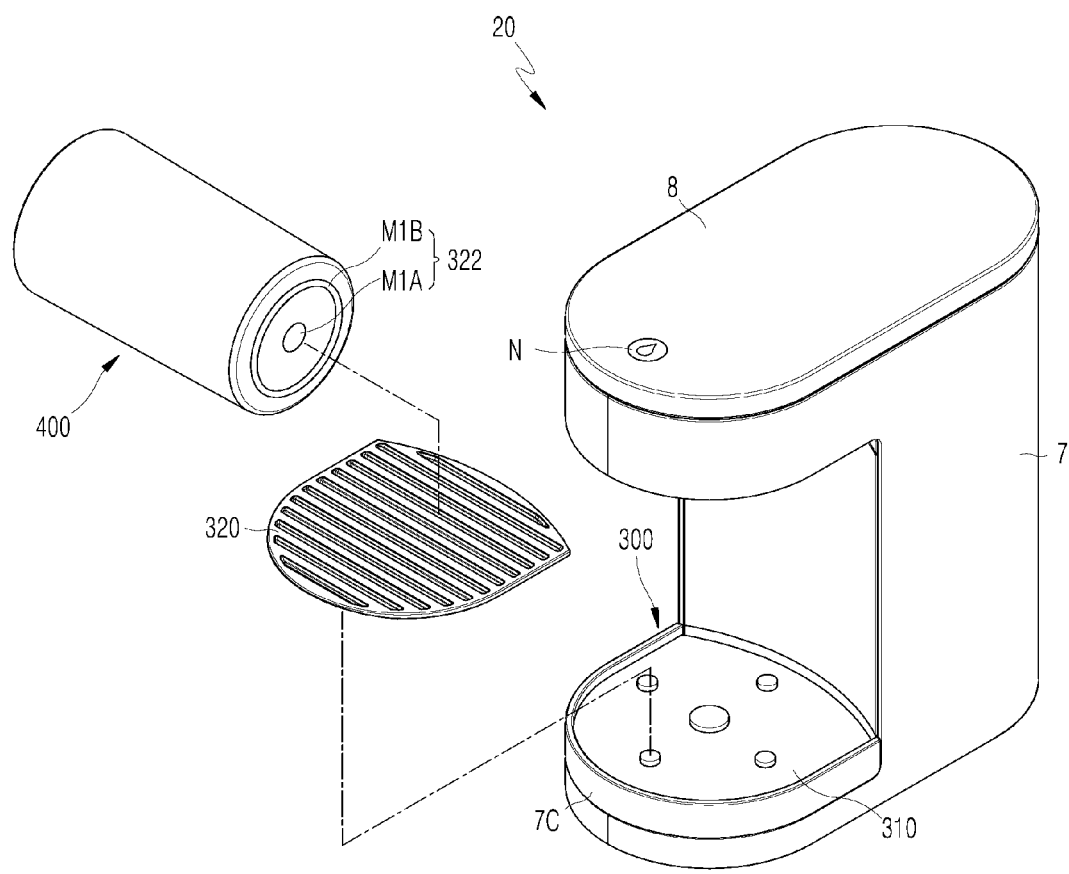

[Fig. 8]
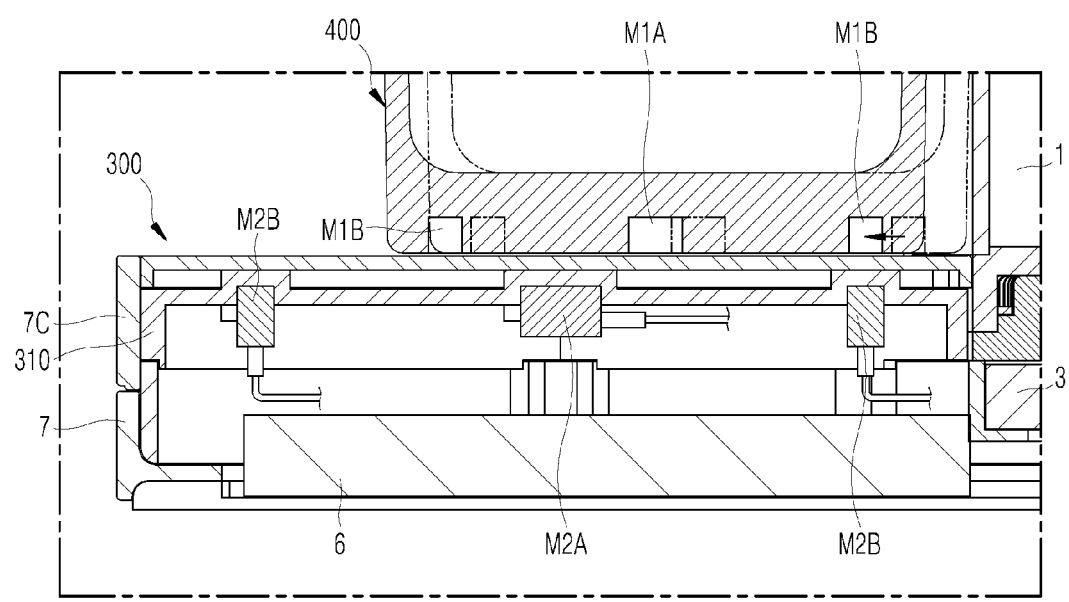

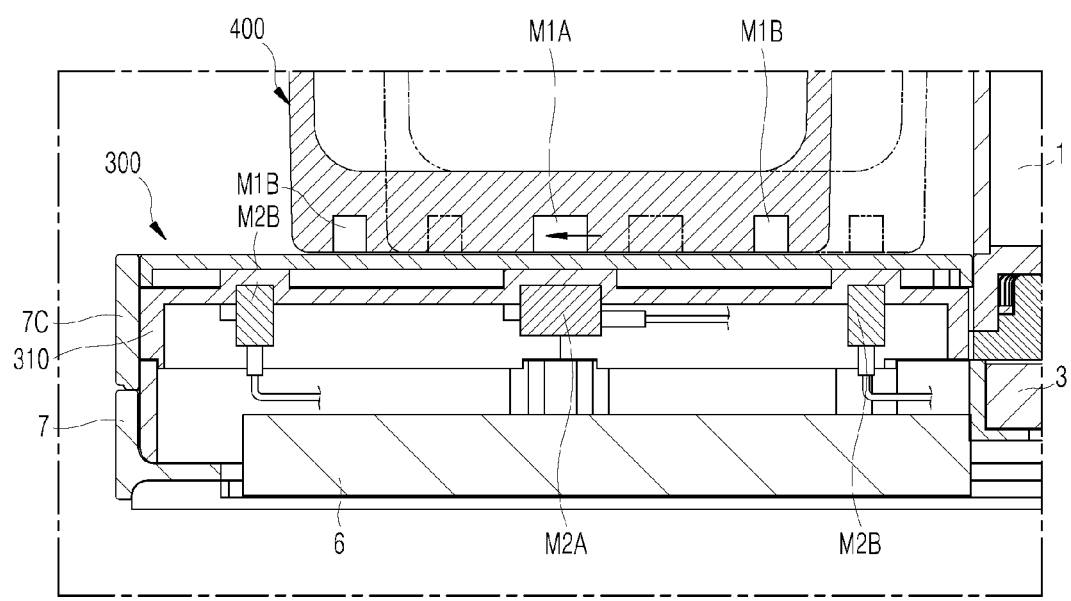
【Fig. 9】

【Fig. 10A】
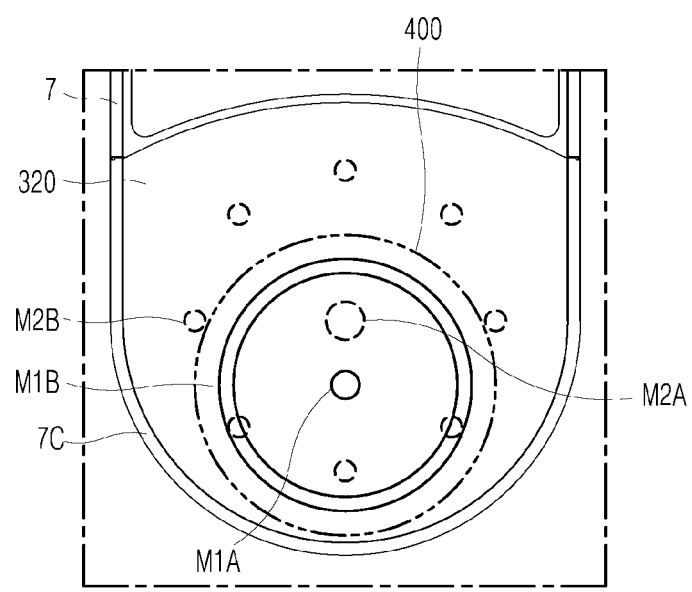

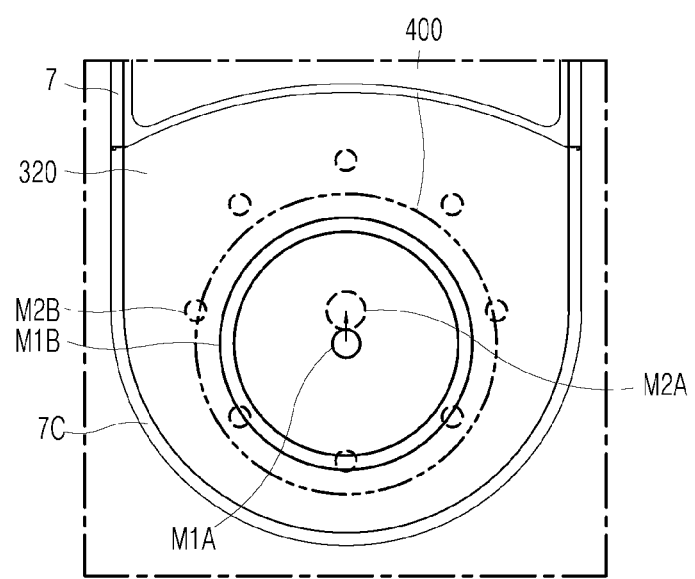
[Fig. 10B]

[Fig. 10C]
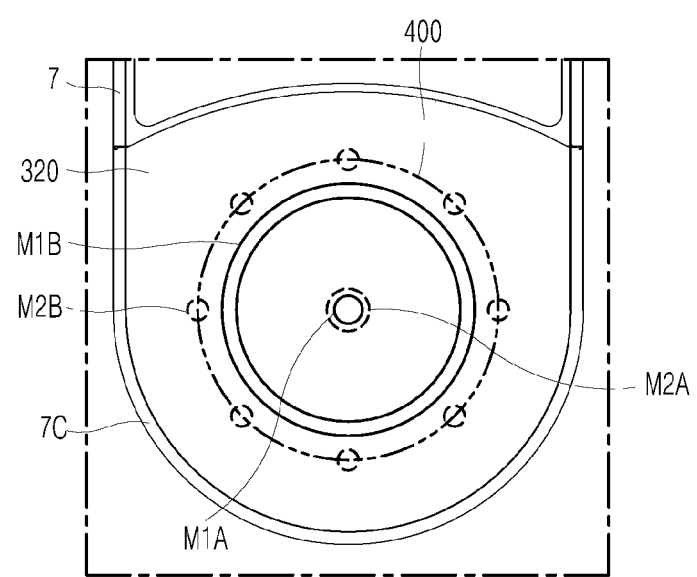

[Fig. 11]
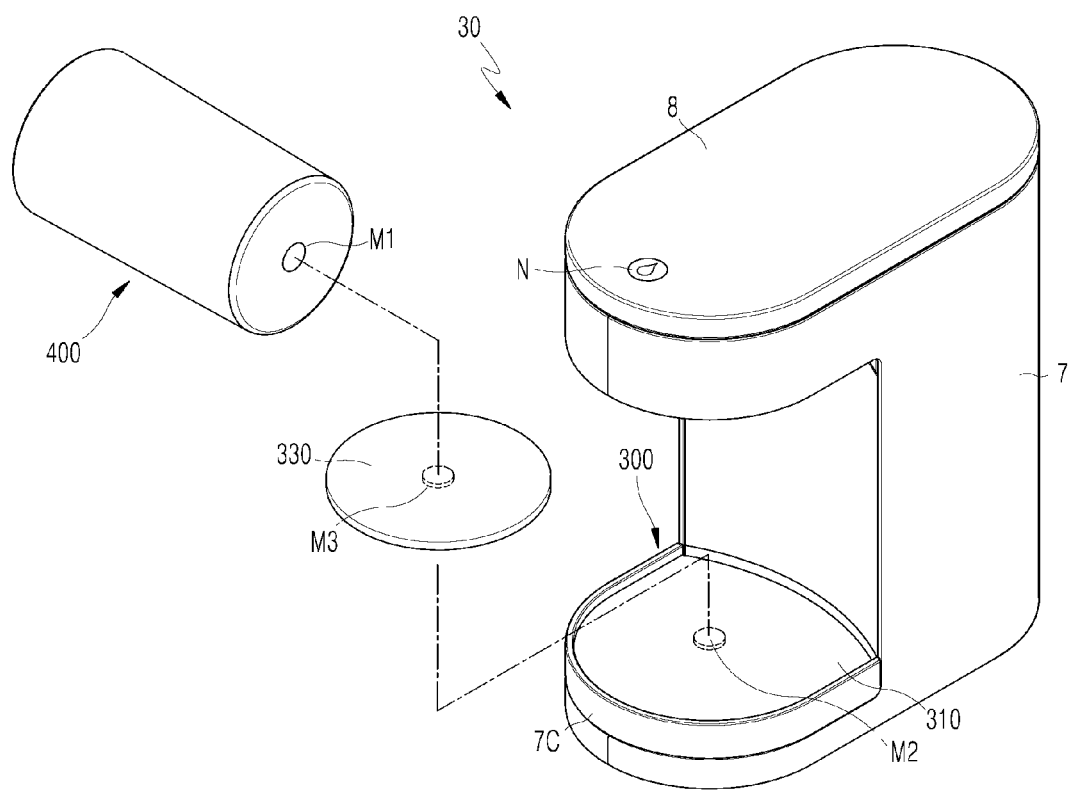

[Fig. 12]
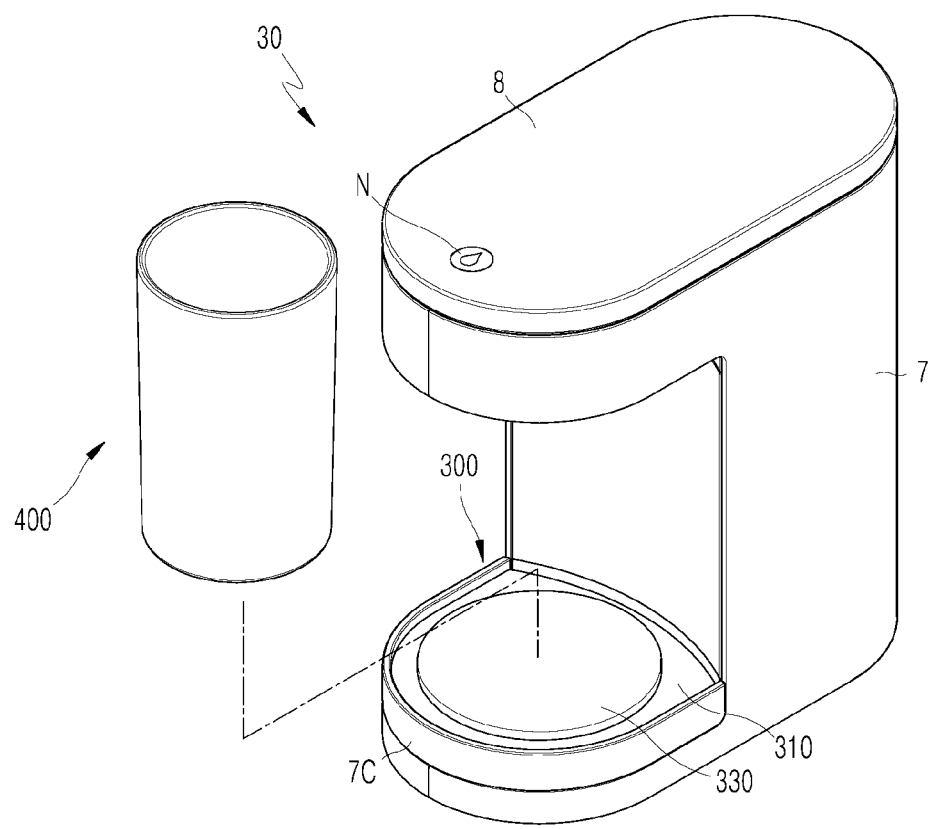

[Fig. 13]
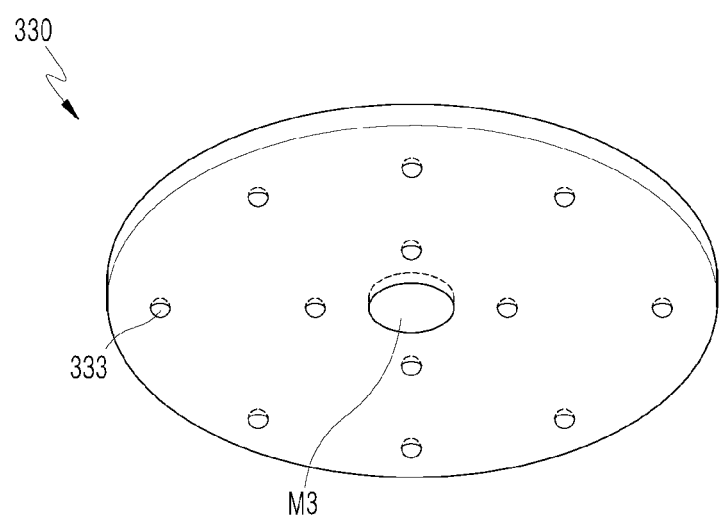

[Fig. 14]
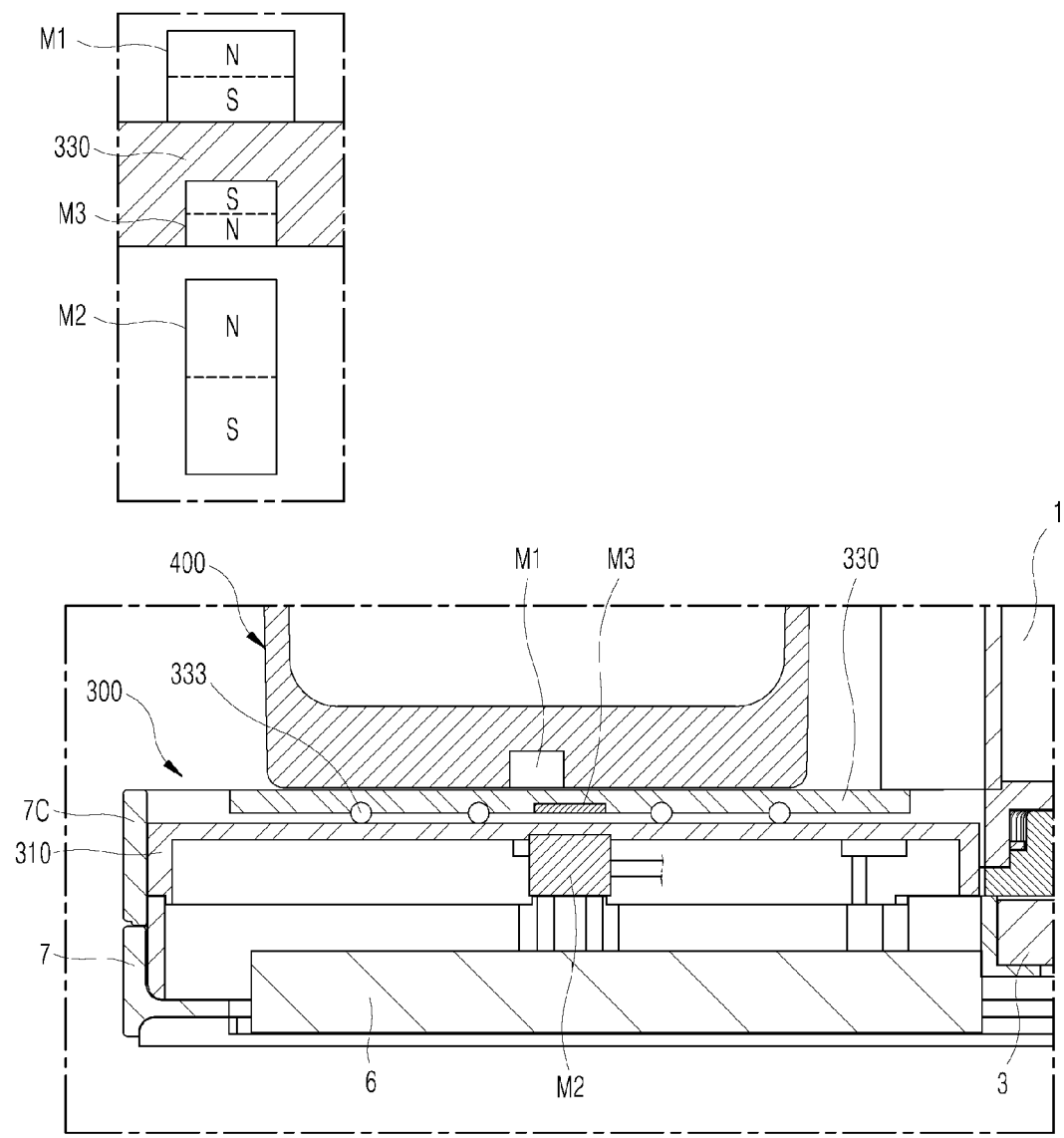

【Fig. 15】
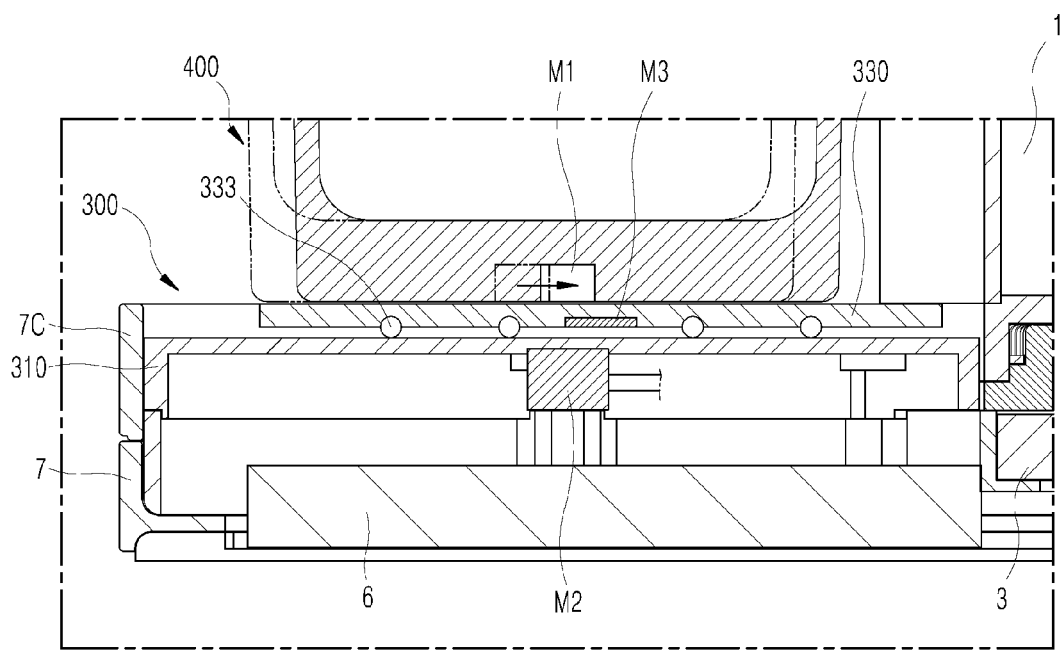

【Fig. 16】
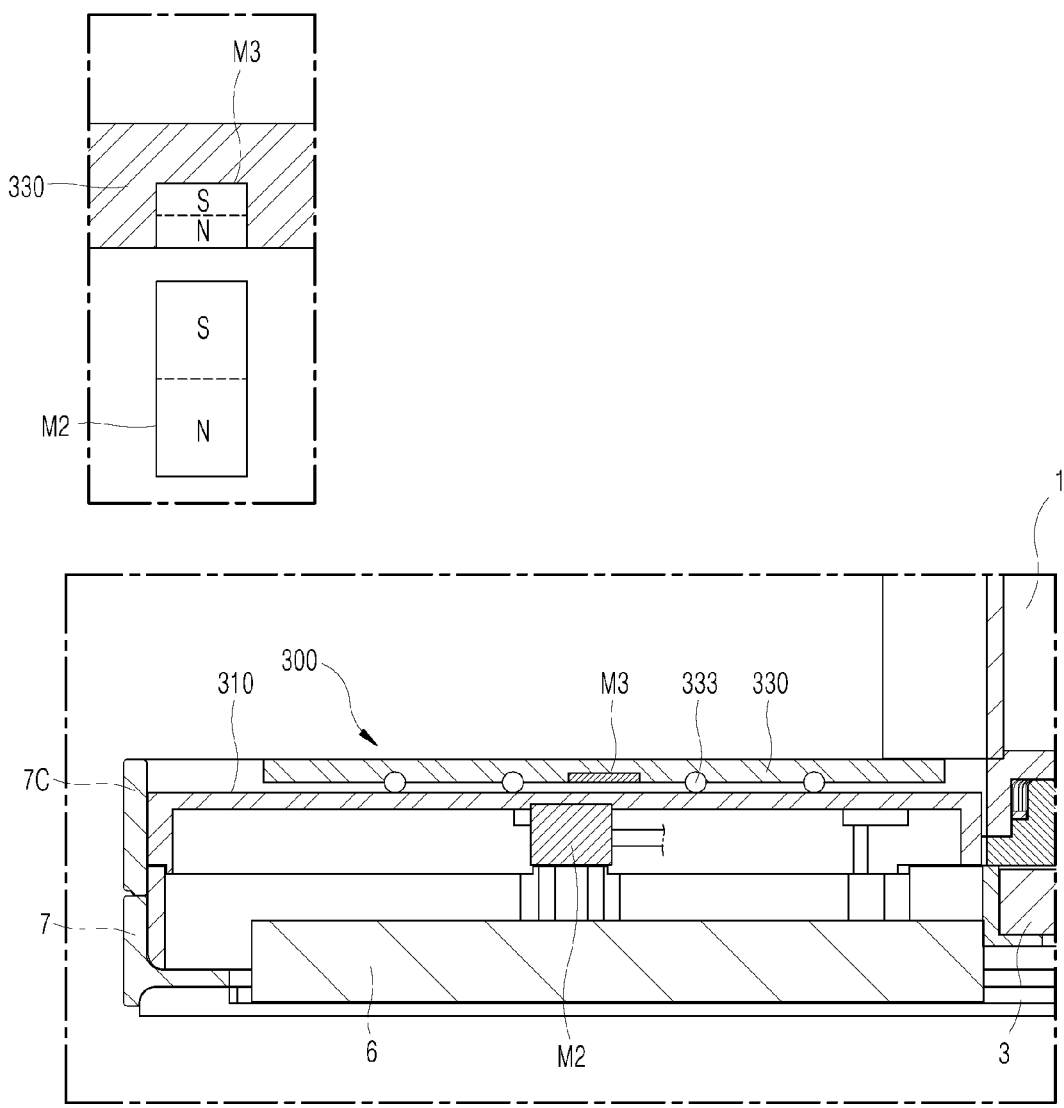

[Fig. 17]
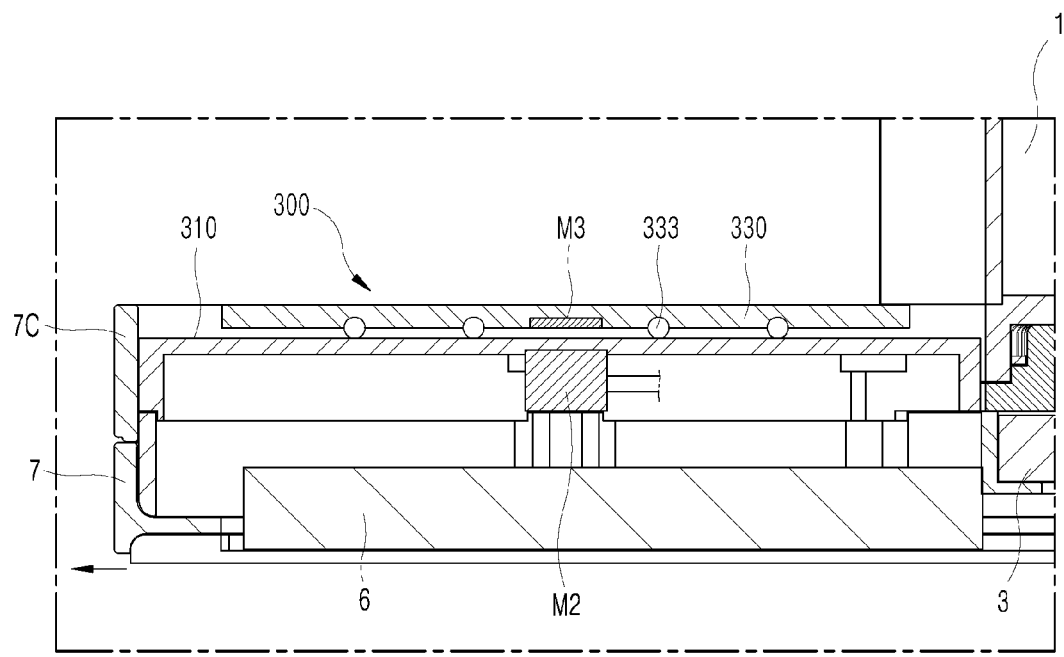

[Fig. 18A]
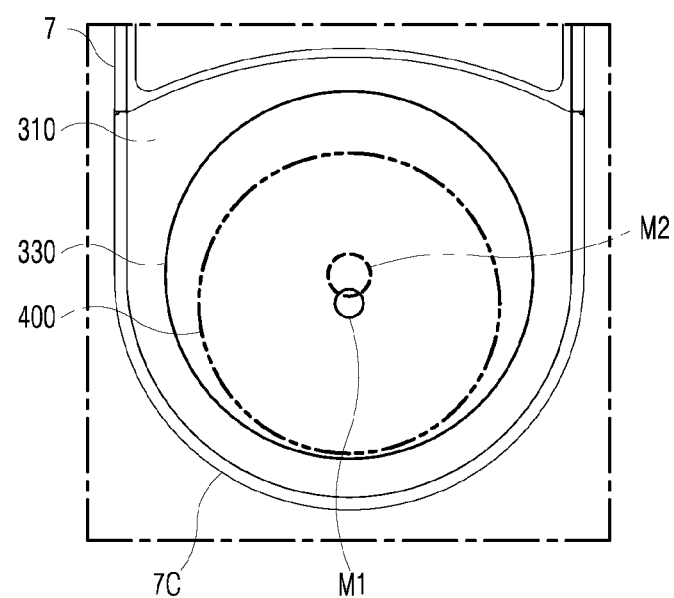

[Fig. 18B]
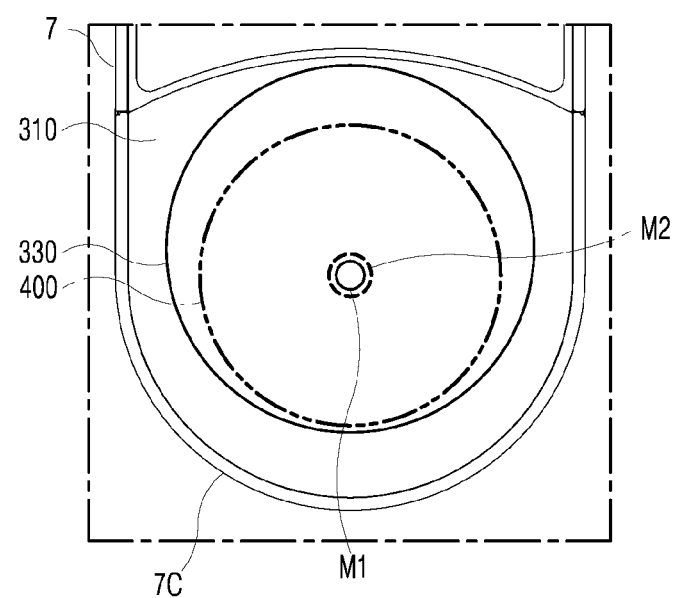

【Fig. 19A】
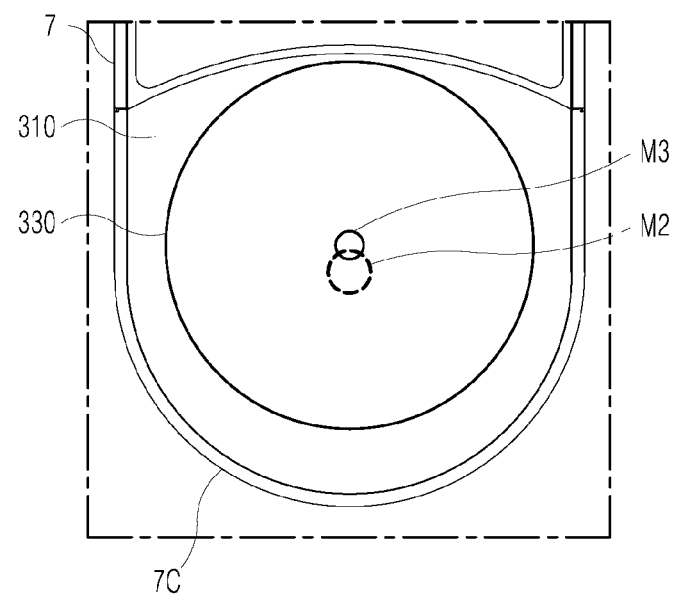

【Fig. 19B】
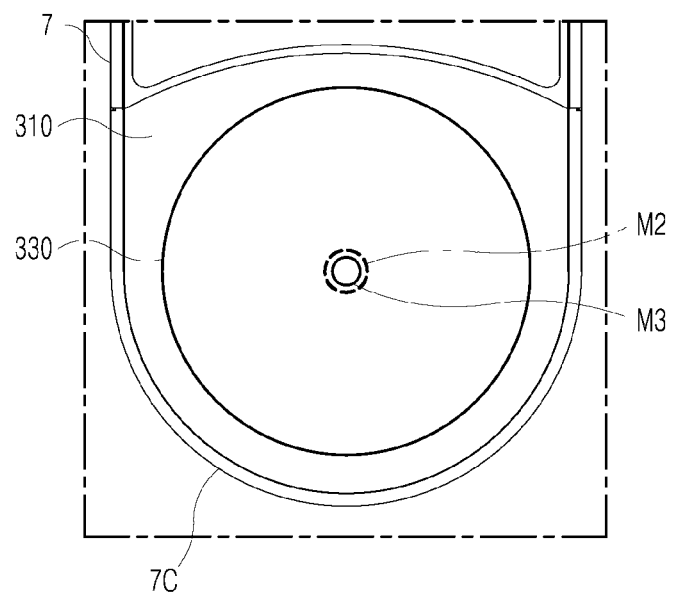

[Fig. 20]
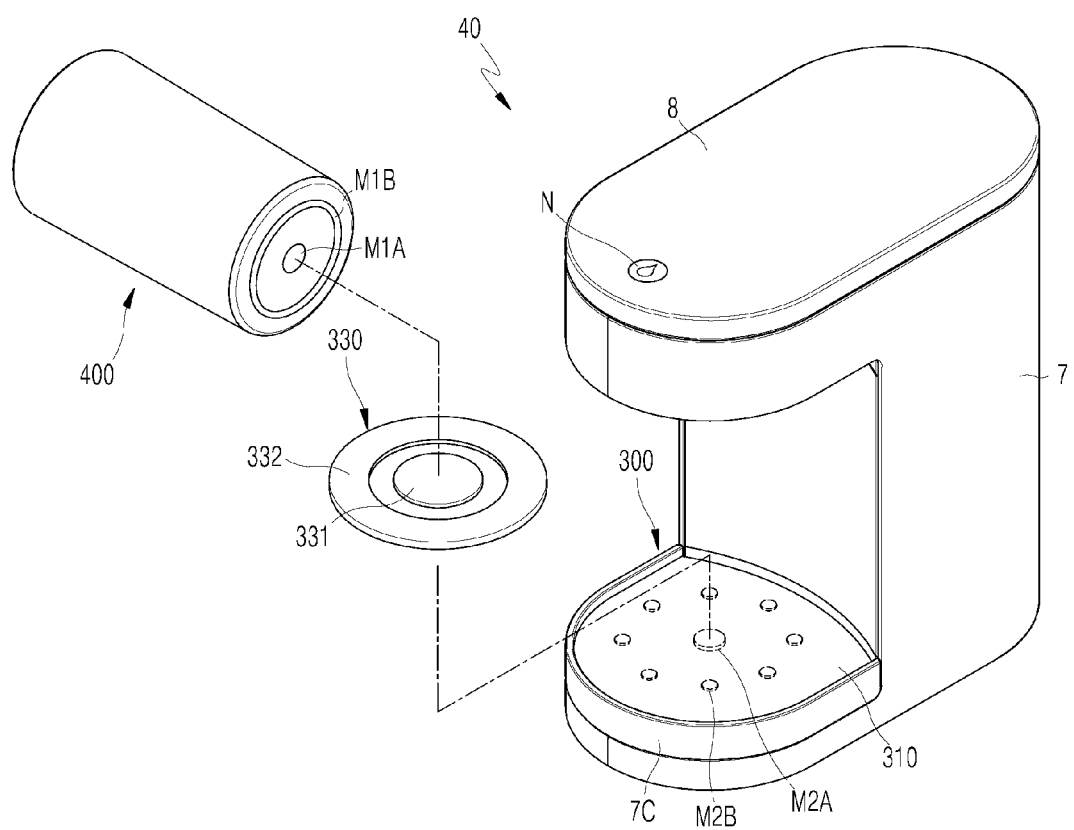

【Fig. 21】
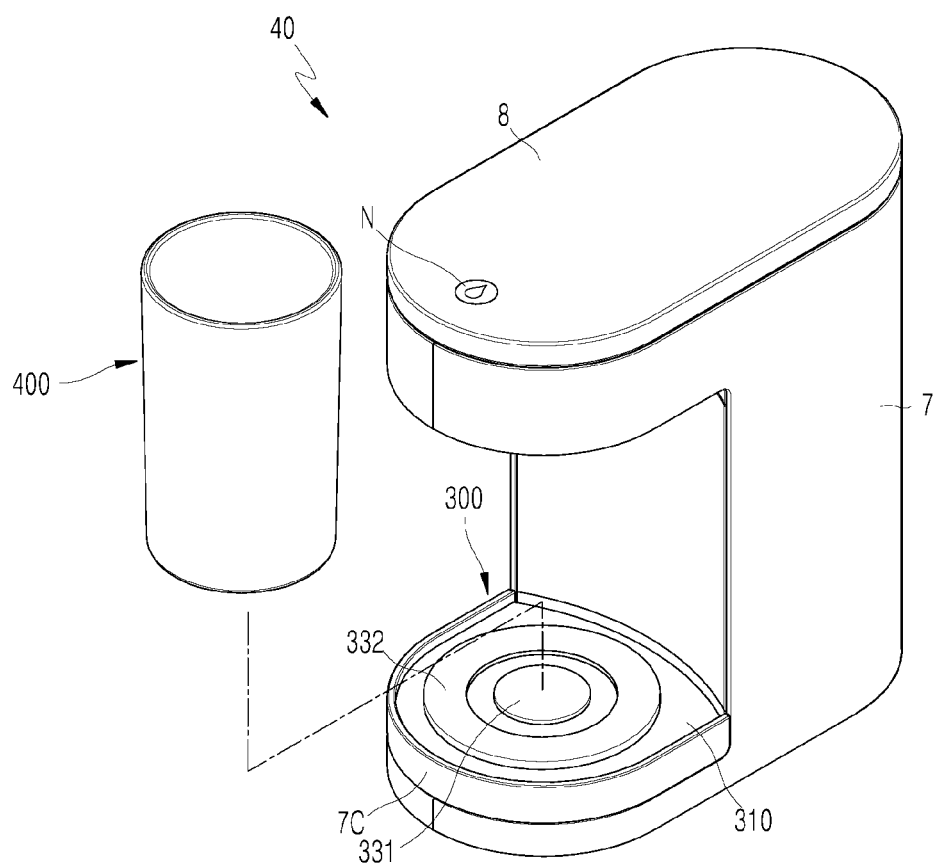

[Fig. 22]
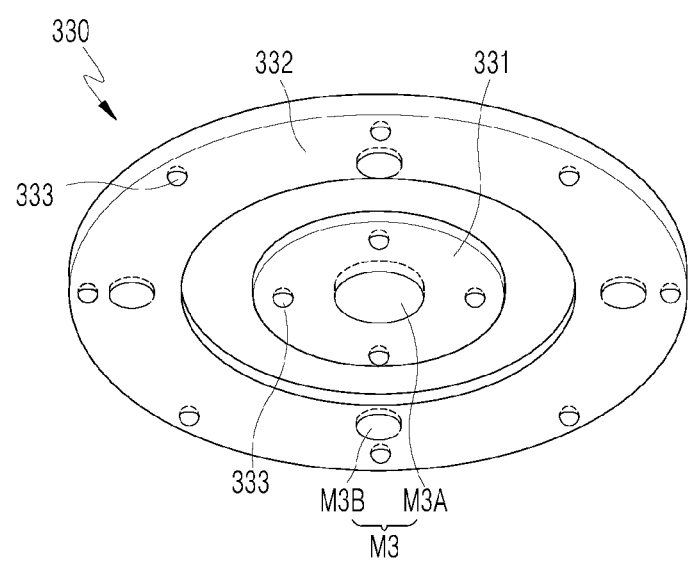

[Fig. 23]
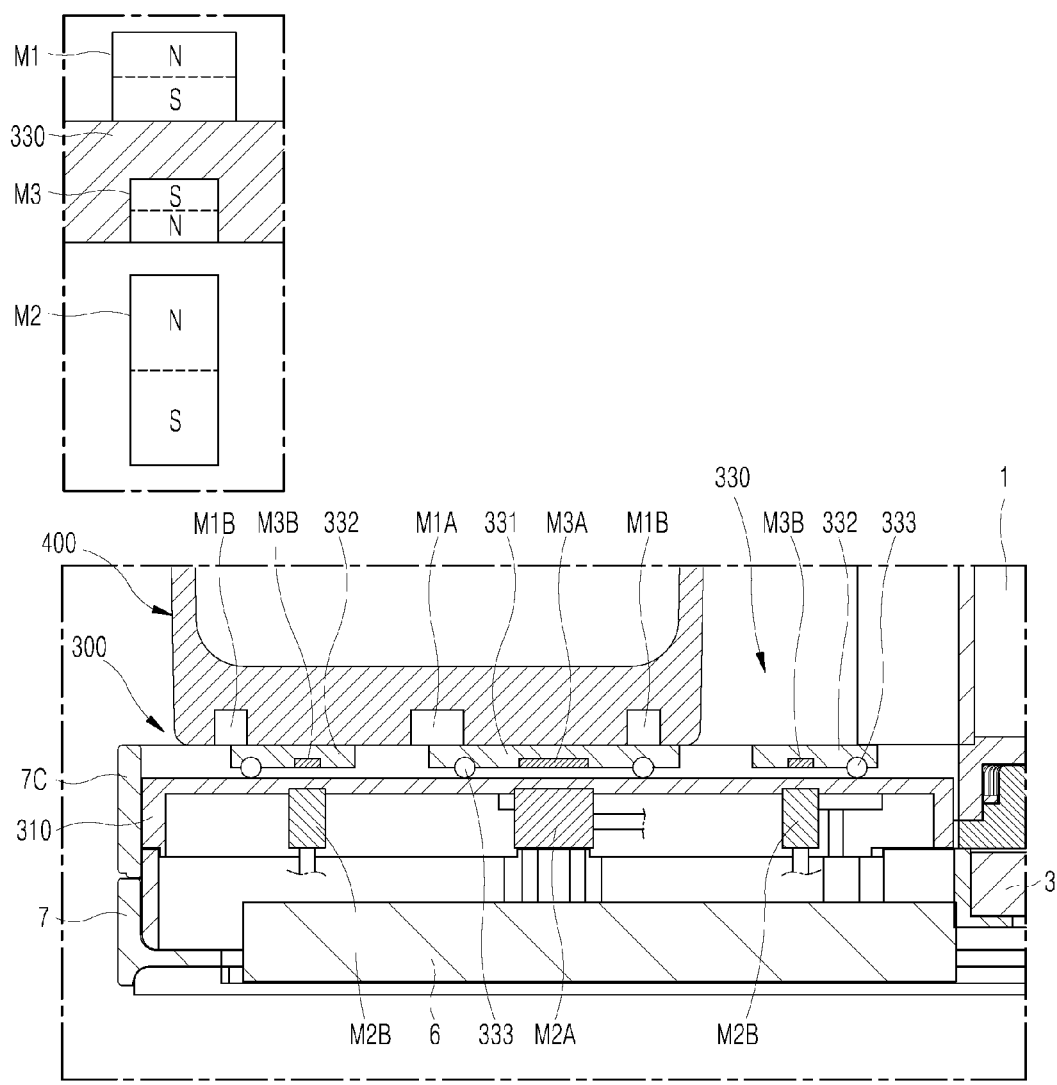

【Fig. 24】
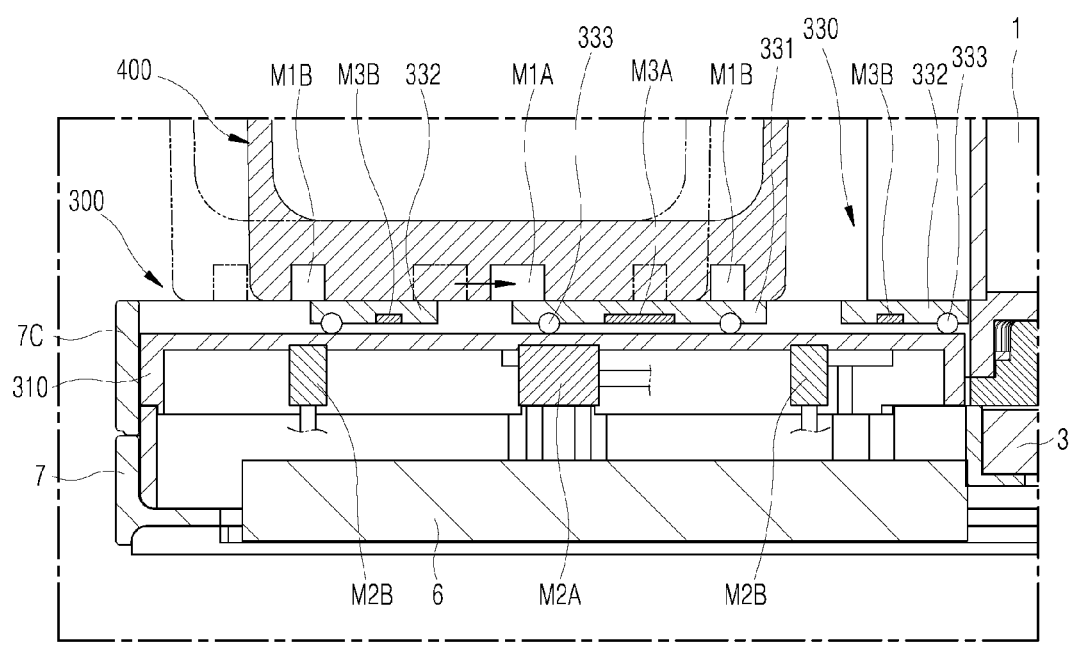

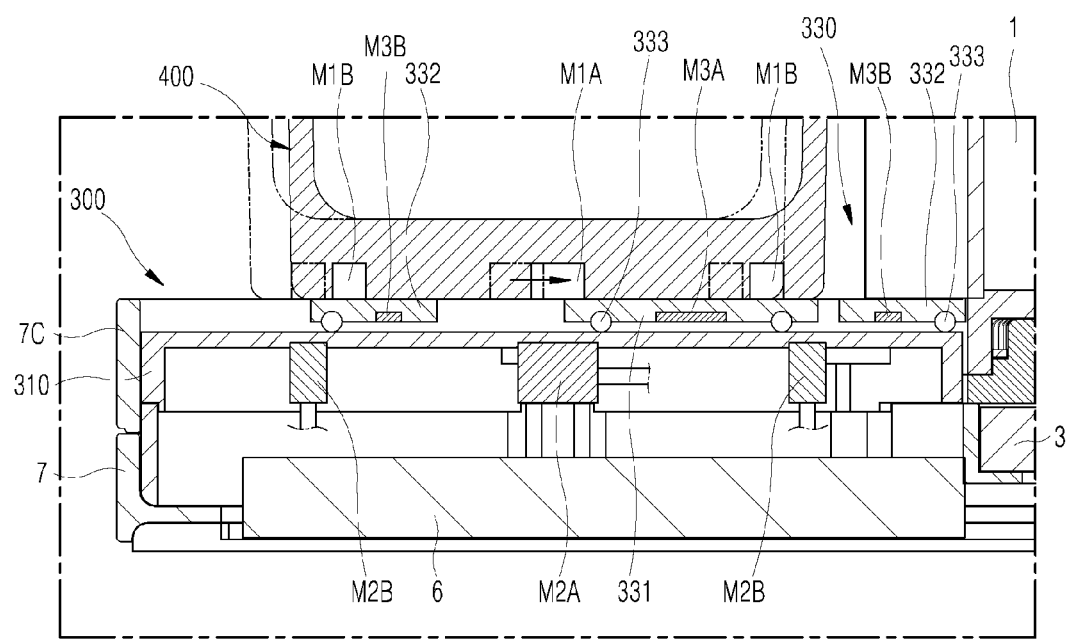
[Fig. 25]

【Fig. 26】
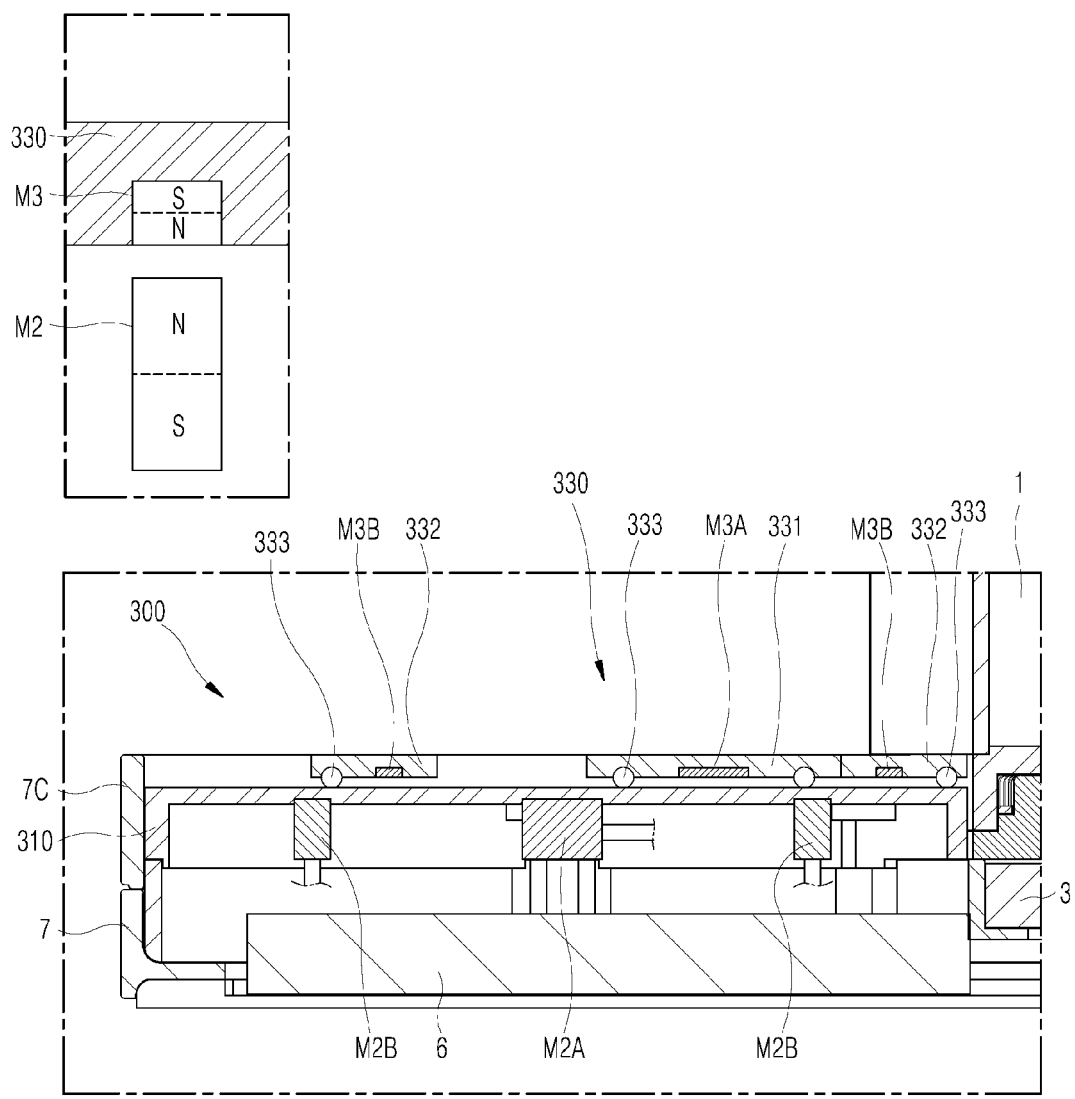

【Fig. 27】
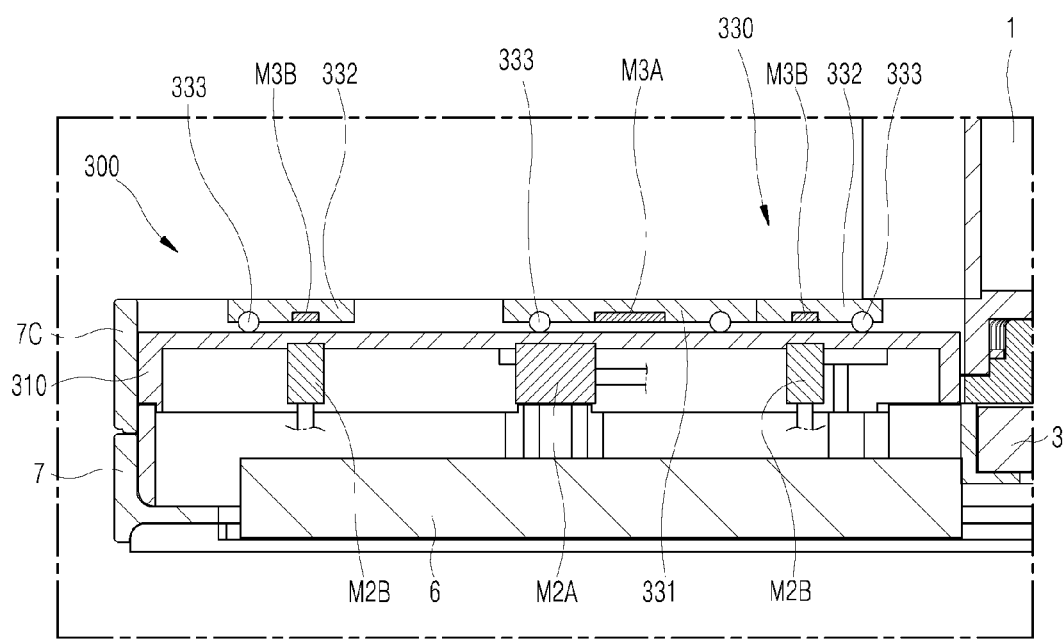

[Fig. 28]
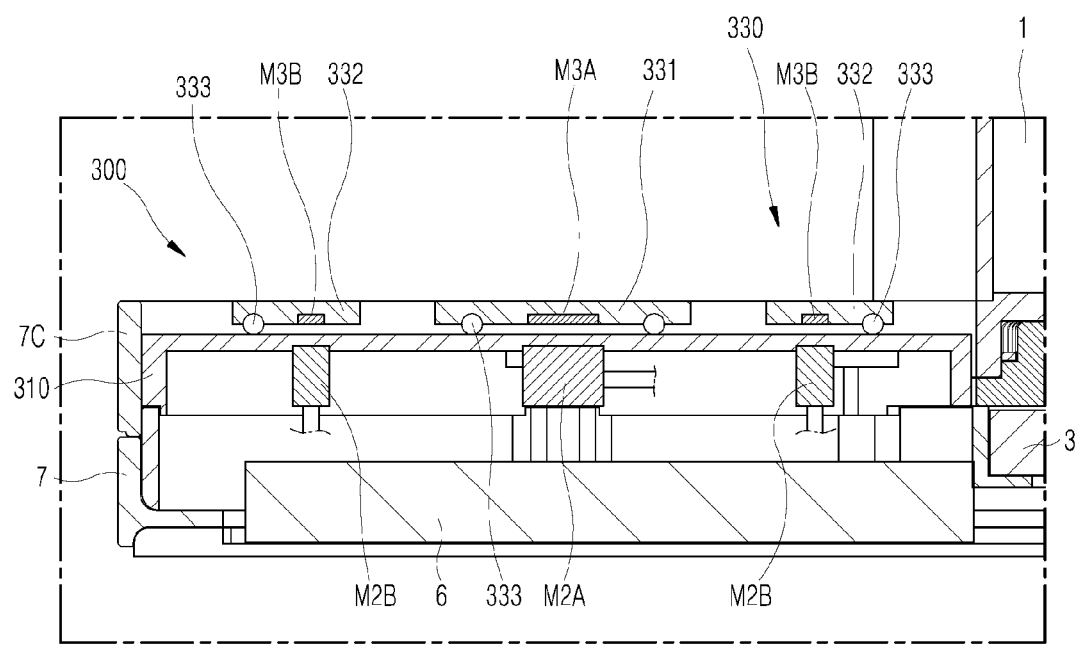

【Fig. 29A】
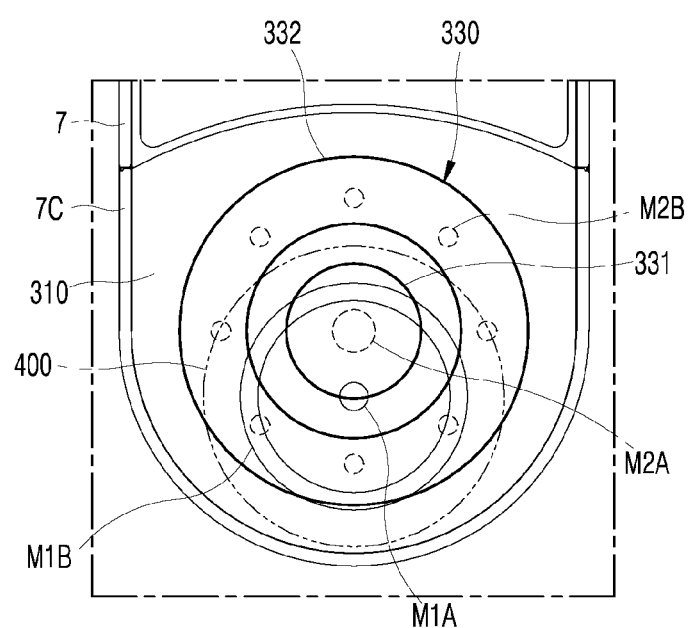

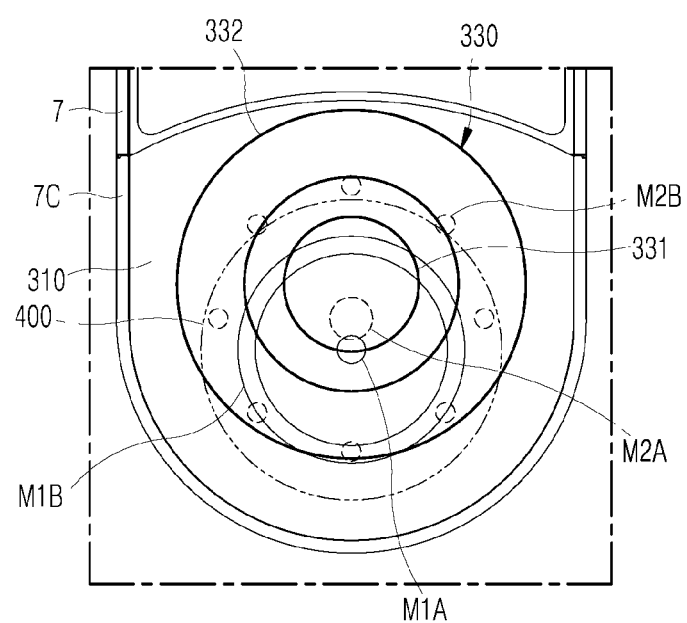
[Fig. 29B]

[Fig. 29C]
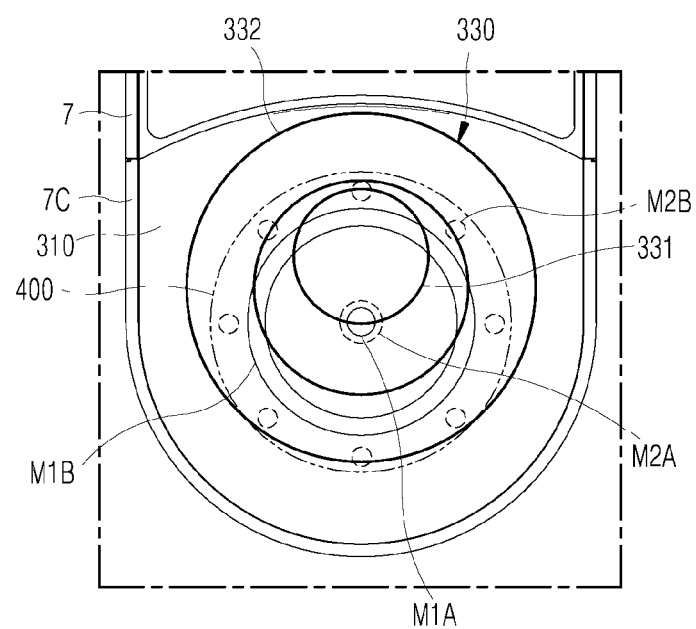

【Fig. 30A】
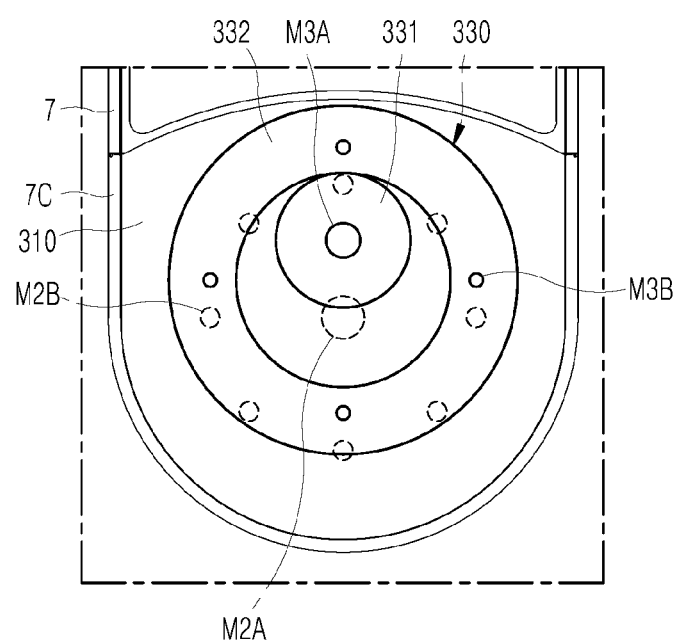

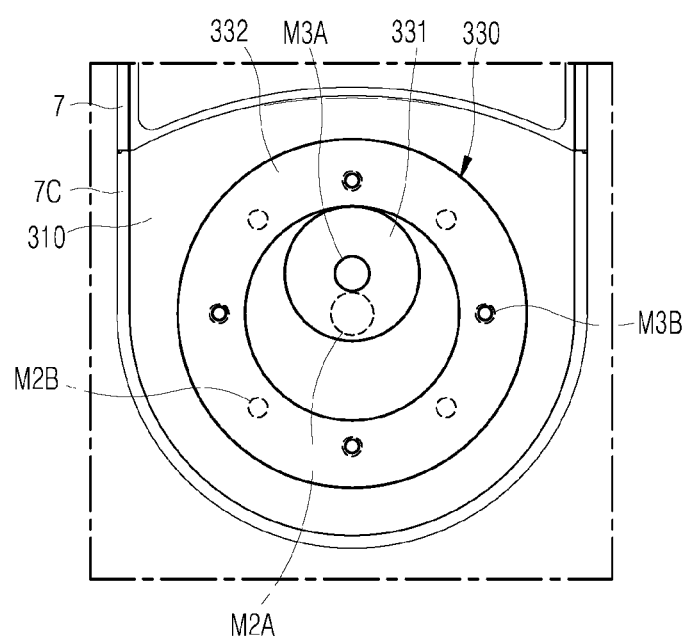
【Fig. 30B】

[Fig. 30C]
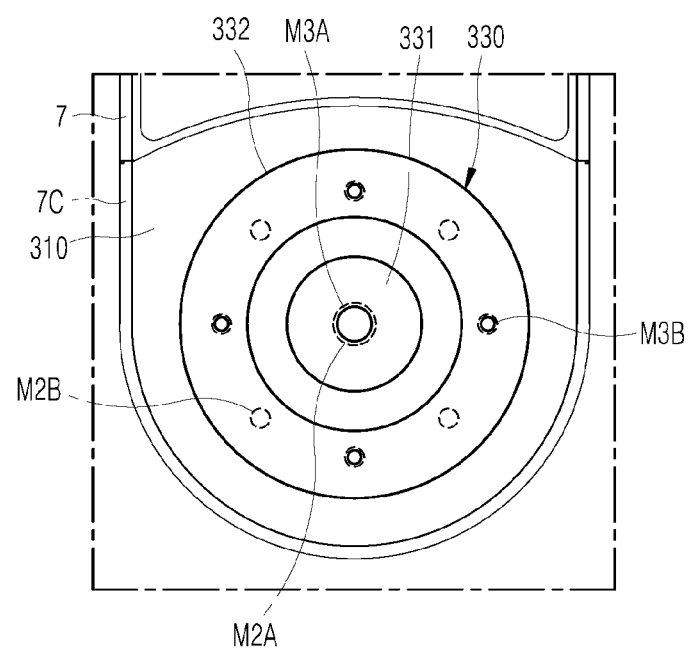

【Fig. 31】
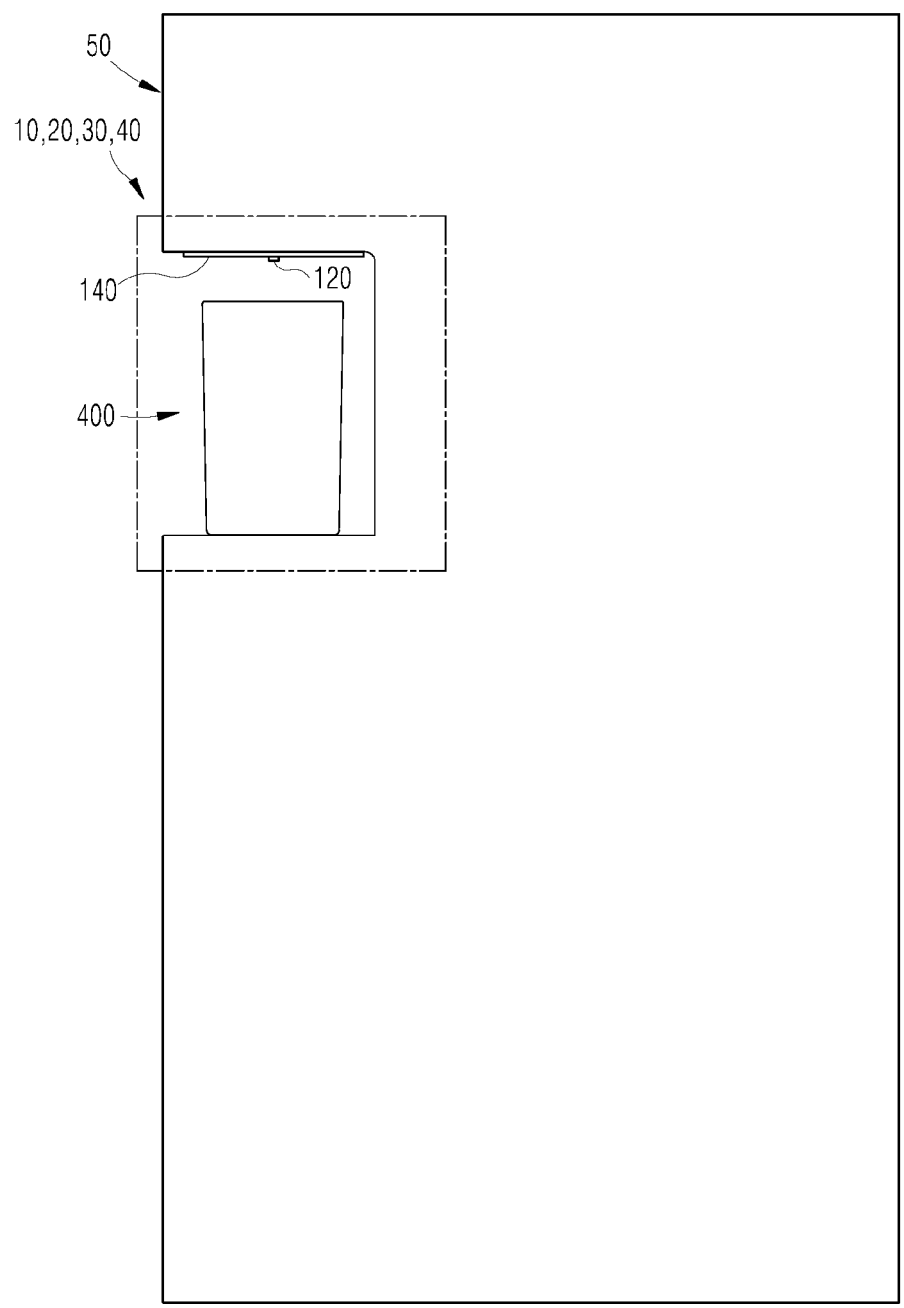

HYDROGEN WATER GENERATOR

CROSS-REFERENCE TO RELATED APPLICATIONS

This application claims the benefit of priority to Korean Patent Application Nos. 10-2019-0055936 filed on May 13, 2019 and 10-2019-0083238 filed on Jul. 10, 2019 with the Korean Intellectual Property Office, the entire contents of which are incorporated herein by reference.

FIELD OF THE DISCLOSURE

The present disclosure relates to a hydrogen water generator, and to a hydrogen water generator that generates hydrogen water and discharges hydrogen water.

BACKGROUND

Oxygen radicals are highly oxidizing agents that, in a human body, attack cells and cause damage. Excessive oxygen radicals within the human body can bring about disease related to old age and can be a direct cause of aging itself.

When hydrogen is absorbed into the human body, the hydrogen reacts with the oxygen radicals to form sweat or urine that is expelled from the human body, and thus hydrogen is considered a strong antioxidant that suppresses oxygen radicals.

There is high interest in hydrogen water as a means of absorbing hydrogen into the human body, and in particular to hydrogen water generators that generate hydrogen water for drinking. Hydrogen water is water in which hydrogen has been dissolved.

However, for the hydrogen water to react with oxygen radicals to form harmless water, high concentration of hydrogen should be present in the water, but hydrogen, being a nonpolar molecule, does not readily dissolve in water. Therefore, even though hydrogen water is generated and dissolved in water, hydrogen readily escapes leaving the hydrogen water with low hydrogen concentration.

Accordingly, while it is important to efficiently decompose water into hydrogen and oxygen in a hydrogen water generator to generate a large volume of hydrogen, it is equally important for the hydrogen water generator to maintain a high concentration of hydrogen in the hydrogen water and prevent hydrogen loss until the hydrogen water is consumed by a user. In addition, in the process of discharging the hydrogen water generated through the hydrogen water generator, it is necessary to consider how to easily store the hydrogen water in a water container such as a cup and also prevent the loss of hydrogen.

An example of a hydrogen water generator may be found in Korean Patent No. 1883864. The hydrogen water generator withdraws hydrogen water through a water discharge cork. The user may place a water container in a drip tray under the water discharge cork and receive the hydrogen water discharged from the water discharge cork. In this case, since the hydrogen water generated inside the hydrogen water generator is discharged through the water discharge cork, like the water discharge method of a water purifier, the water container may be placed on the drip tray to receive the hydrogen water from the water discharge cork. It may seem to provide the convenience of the regular water purifier at the time of discharge of hydrogen water.

However, the hydrogen water generator does not provide for accurately positioning the water container under the water discharge cock, and thus the discharged hydrogen water may fall into the drip tray without being received by the water container. In order to accurately position the water container under the water discharge cork, the user needs to pay attention, as the hydrogen water may be spilled if the user is inattentive, causing inconvenience. If the upper surface of the water container is narrow, as in a small water container, the inconvenience may be increased because the water container must be placed in a more accurate position. Also, the hydrogen water is simply discharged from the discharge cork, and there is no separate means for preventing the hydrogen from escaping the hydrogen water when the hydrogen water makes impact at the water container, and a large amount of hydrogen loss may occur during discharge of the hydrogen water.

Another example of a hydrogen water generator may be found in Korean Patent No. 1742948. A water bottle is combined with an oxygen/hydrogen generator and water inside the water bottle is sucked inside the hydrogen water generator in order to generate hydrogen water. This hydrogen water generator does not provide for the same convenience as a regular water purifier at the time of discharge of hydrogen water. Also, the hydrogen water generator does not provide for using a regular water container instead of a water bottle, and thus there is no means for guiding a water container to a correct position for discharge of hydrogen water. In addition, the hydrogen water generator does not provide means for preventing escape of hydrogen from the hydrogen water when the hydrogen water is discharged.

In order for a user to drink the hydrogen water, the water bottle must first be combined with the oxygen/hydrogen generator, which generates hydrogen water, and then the water bottle is separated. However, the screw coupling structure of the portable water bottle and the water bottle cap, and the elastic contact structure of the silicon nozzle cap and the nozzle contact structure are required to combine the portable water bottle and the oxygen/hydrogen generator, and considerable time is required to separate the portable water bottle from the oxygen/hydrogen generator, and thus is inconvenient. Furthermore, in the hydrogen water generator, even if the water container is poured with hydrogen water in order to drink the hydrogen water inside the water bottle, there is no separate means for sealing to prevent the loss of hydrogen.

Meanwhile, another example of a hydrogen water generator may be found in Korean Patent No. 1795735. The hydrogen water generator includes a hydrogen generation module, a storage unit, a power supply unit, a sensor unit and a control unit.

The hydrogen water generator can be used as follows: First, a straw is inserted into a cup filled with drinking water. Then, one side of a tube is connected to a connector portion of an adapter cap provided at the top of the hydrogen generator, and the other side of the tube is connected to the straw. The hydrogen water generator can then be operated to introduce hydrogen into the cup filled with drinking water through the tube to be dissolved and then the generated hydrogen water may be consumed.

Similar to the hydrogen water generator described above, the hydrogen water generator does not provide for the same convenience as a regular water purifier at the time of discharge of hydrogen water. Also, the hydrogen water generator does not provide for a means for guiding a water container to a correct position for discharge of hydrogen water. Furthermore, the hydrogen water generator provides no separate means for sealing to prevent the loss of hydrogen.

SUMMARY

One aspect is to provide a hydrogen water generator to discharge the hydrogen water to a water container that provides a convenience of a normal water purifier when the hydrogen water is discharged, and to place the water container in a correct position.

Another aspect is to provide a hydrogen water generator in which a water container may be immediately placed in a correct position in relation to a means for sealing upon discharge of hydrogen water.

Another aspect is to provide a hydrogen water generator that may immediately move the water container to an appropriate position, even if the user places the water container in an incorrect position.

Another aspect is to provide a hydrogen water generator having a means for immediately moving a water container placed by a user to an appropriate position in relation to an water outlet.

Another aspect is to provide a hydrogen water generator that may minimize the loss of hydrogen at the time of discharge and after the discharge of hydrogen water.

The disclosure describes a hydrogen water generator that includes a hydrogen water discharger including a water outlet, a seating unit disposed under the water outlet and forming a seating surface, a water container seatable on the seating surface and including an opening at an upper end of the water container, and a first magnetic body at a lower end of the water container, and the seating unit including a second magnetic body. When the water container is seated on the seating surface, the first magnetic body and the second magnetic body are attractable to each other to position the water container with respect to the water outlet.

BRIEF DESCRIPTION OF THE DRAWINGS

FIG. 1 is a perspective view of a hydrogen water generator according to an embodiment of the present invention.

FIGS. 2A and 2B are side views showing a state of use of the hydrogen water generator of FIG. 1.

FIGS. 3A and 3B are side cross-sectional views showing a state of use of the hydrogen water generator of FIG. 1.

FIG. 4 is a partially exploded perspective view of the hydrogen water generator of FIG. 1.

FIG. 5 is a partial side cross-sectional view showing a state of use of the hydrogen water generator of FIG. 1.

FIG. 6 is a partial plan view showing a movement path of a water container at the hydrogen water generator of FIG. 1.

FIG. 7 is a partially exploded perspective view of a hydrogen water generator according to another embodiment of the present invention.

FIGS. 8 and 9 are partial side cross-sectional views showing a state of use of the hydrogen water generator of FIG. 7.

FIGS. 10A, 10B, and 10C are partial plan views showing a movement path of a water container of the hydrogen water generator of FIG. 7.

FIG. 11 is a partially exploded perspective view of the hydrogen water generator according to another embodiment of the present invention.

FIG. 12 is a perspective view of the hydrogen water generator according to the another embodiment of the present invention.

FIG. 13 is a bottom perspective view of a rolling plate of the hydrogen water generator of FIG. 11.

FIGS. 14 to 17 are partial side cross-sectional views showing a state of use of the hydrogen water generator of FIG. 12.

FIGS. 18A and 18B are partial plan views showing movement paths of water container and the rolling plate of the hydrogen water generator of FIG. 12.

FIGS. 19A and 19B are partial plan views showing a movement path of the rolling plate of the hydrogen water generator of FIG. 12.

FIG. 20 is a partial exploded perspective view of a hydrogen water generator according to another embodiment of the present invention.

FIG. 21 is a perspective view of the hydrogen water generator according to the another embodiment of the present invention.

FIG. 22 is a bottom perspective view of a rolling plate of the hydrogen water generator of FIG. 20.

FIGS. 23 to 28 are partial side cross-sectional views showing a state of use of the hydrogen water generator of FIG. 21.

FIGS. 29A, 29B, and 29C are partial plan views showing movement paths of a water container and the rolling plate of the hydrogen water generator of FIG. 21.

FIGS. 30A, 30B, and 30C are partial plan views showing movement paths of the rolling plate of the hydrogen water generator of FIG. 21.

FIG. 31 is a view showing a hydrogen water generator according to various embodiments of the present invention integrated with an appliance.

DETAILED DESCRIPTION OF THE PREFERRED EMBODIMENTS

Hereinafter, preferred embodiments of the present invention will be described in detail with reference to the accompanying drawings. However, in describing the preferred embodiments, descriptions of already known functions or configurations may be omitted in order to avoid obscuring the features of the preferred embodiments.

FIG. 1 is a perspective view of a hydrogen water generator according to an embodiment of the present invention, FIGS. 2A and 2B are side views showing a state of use of the hydrogen water generator of FIG. 1, and FIGS. 3A and 3B are side cross-sectional views showing a state of use of the hydrogen water generator of FIG. 1.

The hydrogen water generator 10 (20, 30, and 40 to be described below) according to various embodiments of the present invention, is a device for generating and discharging hydrogen water, which is water in which hydrogen molecules are dissolved, and comprises the main body that includes a water tank and an electrode module. The hydrogen water generator according to the embodiments of the present invention may be formed as an independent device. Alternatively, the hydrogen water generator according to the embodiments of the present invention may form part of another apparatus 50 as shown in FIG. 31. For example, the hydrogen water generator may be coupled to a water purifier or a refrigerator, and the like, to form part of the water purifier or the refrigerator, and the like. That is, the main body of the hydrogen water generator may be integrally formed with an apparatus such as the water purifier or the refrigerator, and the like.

As shown in FIGS. 3A and 3B, the hydrogen water generator 10 according to an embodiment of the present invention is a device for generating hydrogen water in which hydrogen molecules ($H_2$) are dissolved and discharged through a water outlet 121. The hydrogen water generator 10 includes a water tank 1, a water inlet 2, an electrode module 3, a water pump 4, a controller 5, a battery 6, a body 7, a top plate 8, a hydrogen water discharger 100, a driver 200, a seating unit 300, and a water container 400. The main features of the hydrogen water generator 10 according to the embodiment of the present invention may be the hydrogen water discharger 100, the driver 200, the seating unit 300, and the water container 400. Therefore, the water tank 1, the water inlet 2, the electrode module 3, the water pump 4, the controller 5, the battery 6, the body 7, and the top plate 8 will be briefly described.

The water tank 1 is a structure which forms a space in which hydrogen water is generated and stored, and water is supplied through the water inlet 2. The water inlet 2 may be opened and closed by the top plate 8. The top plate 8 may slide back and forth in a horizontal direction operated by an actuator AC to open and close the water inlet 2. The actuator AC may include a motor AC1, a pinion AC2, and a rack AC3. Motor AC1 may be coupled to support a panel 7A via a bracket. When the pinion AC2 is rotated by the motor AC1, the rack AC3 may move in the horizontal direction. At this time, the top plate 8 coupled with the rack AC3 opens or closes the water inlet 2.

As shown in FIGS. 3A and 3B, the electrode module 3 may be provided at the bottom of the water tank 1. The electrode module 3 may use a known technique for generating hydrogen by electrolyzing water. The technique for generating hydrogen by electrolyzing water is a well-known technique, and for example, is described in Korean Patent Nos. 1883864 and 1742948, and further description, therefore, will be omitted.

The water pump 4 is configured to pump the hydrogen water stored in the water tank 1 towards the water outlet 121. The hydrogen water pumped by the water pump 4 flows toward the water outlet 121 through a tube T. As shown in FIG. 3B, the hydrogen water discharged through the water outlet 121 is received inside the water container 400 through a top opening of the water container 400 placed on the seating unit 300. The body 7 forms the skeleton and appearance of the hydrogen water generator 10. An operation button N may be installed at the body 7. The controller 5 controls the overall operation of the hydrogen water generator 10, and may be an electronic circuit. The battery 6 supplies power to the electrode module 3, the water pump 4, the controller 5, the hydrogen water discharger 100, the driver 200, the seating unit 300, and the actuator AC.

As shown in FIGS. 3A and 3B, the hydrogen water discharger 100 includes a configuration that covers the top opening of the water container 400 when the hydrogen water is discharged, and includes a body 110, a nozzle 120, a connector 130 and an elastic member 140. The body 110 is configured to form the skeleton and appearance of the hydrogen water discharger 100, and may be formed in a cylindrical shape. The body 110 may be raised by the operation of the driver 200 and inserted into the body 7 (see FIG. 3A) or lowered to be exposed to the outside of the body 7 (FIG. 3B). An outer surface of the body 110 may form a relatively small gap with the body 7. An O-ring blocking the movement of the gas may be interposed between the outer surface of the body 110 and the body 7. The nozzle 120 may form the water outlet 121. Hydrogen water is discharged in the direction of gravity through the water outlet 121. The nozzle 120 may be coupled to a connection pipe 122 inside the body 110. An end of the tube T may be inserted into the connecting tube 122. The end of the tube T moves up and down from the hydrogen water discharger 100, but maintains a state inserted into the connection pipe 122. An 0-ring may be interposed between the tube T and the connection pipe 122. The elastic member 140 may be in close contact with an opening circumference of the water container 400 when the body 110 descends, and may be formed of a material that is elastically deformable, such as silicon and rubber. The elastic member 140 may be coupled to a lower end of the body 110 by the edge of the body 110. The nozzle 120 may be coupled to the center of the elastic member 140 through the connector 130. The elastic member 140 may form a symmetrical shape around the water outlet 121. The elastic member 140 may form a disc shape that is convex downward.

As shown in FIG. 3A and FIG. 3B, the driver 200 is configured to move the hydrogen water discharger 100 up and down, and may include a motor 210, a pinion 220, and a rack 230. The motor 210 may be coupled to a mounting panel 7B, and the mounting panel 7B may be coupled to the supporting panel 7A. The support panel 7A may be part of the body 7. The pinion 220 may be coupled to a shaft of the motor 210. The rack 230 may be coupled to the body 110 through a coupling portion 111. The rack 230 may be an elongated shape in the longitudinal direction. When the motor 210 rotates, the rack 230 rises (see FIG. 3A) or descends (see FIG. 3B) together with the hydrogen water discharger 100. A torque limiter may be installed on the shaft of the motor 210. The elastic member 140 may be coupled to the lower end of the rack 230. The elastic member 140 may be additionally supported by the lower end of the rack 230 to suppress the sagging due to its own weight.

As shown in FIG. 3B, when the hydrogen water discharger 100 descends, the elastic member 140 is in close contact with the opening circumference of the water container 400. When the elastic member 140 is in close contact with the opening circumference of the water container 400, the inside of the water container 400 is sealed except for the water outlet 121. Therefore, even if hydrogen escapes from the hydrogen water contained in the water container 400, the gaseous hydrogen may escape to the outside of the water container 400 only through the water outlet 121. One side of the tube T may be provided with a check valve for discharging the hydrogen gas when there is excessive pressure inside the water container 400.

FIG. 4 is a partially exploded perspective view of the hydrogen water generator of FIG. 1, FIG. 5 is a partial side cross-sectional view showing a state of use of the hydrogen water generator of FIG. 1, and FIG. 6 is a partial plan view showing a movement path of the water container at the hydrogen water generator of FIG. 1.

As shown in FIGS. 4 and 5, the seating unit 300 includes a configuration in which when the water container 400 is placed on the seating unit 300, it is disposed below the water outlet 121. The water container 400 is formed with an opening at an upper end thereof to accommodate the hydrogen water falling from the water outlet 121. In the present embodiment, the water container 400 is provided with a first magnetic body M1. The first magnetic body M1 may be mounted at the center of the bottom end of the water container 400. The seating unit 300 may be provided with a second magnetic body M2 forming an attractive force with the first magnetic body M1. The seating unit 300 includes a seating panel 310 and a seating plate 320. The second magnetic body M2 may be disposed on the seating panel 310, and may be disposed below the seating plate 320. The seating plate 320 may form the seating surface on which the water container 400 is placed. The water container 400 may be placed anywhere on the upper surface of the seating plate 320. That is, the seating surface may be the entire upper surface of the seating plate 320.

As shown in FIG. 4, a hole or holes through which water may pass down may be formed at the seating plate 320. Thus, even if a user accidentally spills water on the seating plate 320, the water passes through the holes of the seating plate 320 and may be collected on the seating panel 310. The body 7 may include a shielding portion 7C formed higher than the seating panel 310 around the seating panel 310. The shielding portion 7C may prevent the water spilled on the seating plate 320 from overflowing outside of the seating panel 310.

As shown in FIGS. 5 and 6, the second magnetic body M2 may be mounted on the upper end of the seating panel 310 corresponding to the gravity extension line (a center) of the water outlet 121. FIG. 6 only shows an outline of the seating plate 320 and does not show the holes of the seating plate 320 for easy understanding of the first magnetic body M1, the second magnetic body M2, and the water container 400. In FIG. 6, only an outline of the bottom of the water container 400 is shown. The water container 400 may be formed in a cylindrical shape. The first magnetic body M1 may be mounted at the center of the bottom of the water container 400. The water container 400 may stably receive the water falling from the water outlet 121 when the first magnetic body M1 is attracted and positioned directly above the second magnetic body M2.

The first magnetic body M1 may be made of a permanent magnet or a ferromagnetic body. The second magnetic body M2 may be made of a permanent magnet or a ferromagnetic body. For example, both the first magnetic body M1 and the second magnetic body M2 may be permanent magnets, or the first magnetic body M1 may be a ferromagnetic body and the second magnetic body M2 may be a permanent magnet, or vice versa. In the hydrogen water generator 10 according to the present embodiment, the first magnetic body M1 and the second magnetic body M2 form an attraction force with each other when the user places the water container 400 on the seating surface of the seating plate 320. Therefore, the water container 400 is guided to be located directly below the water outlet 121 due to the attraction force between the first magnetic body M1 and the second magnetic body M2.

Referring to FIGS. 3A and 3B, when the user presses the operation button N, the controller 5 operates the driver 200 and the water pump 4 in order. That is, when the user presses the operation button N, the hydrogen water discharger 100 is first lowered and when the elastic member 140 is in close contact with the opening circumference of the water container 400, the water pump 4 operates to fill the water container 400 with hydrogen water. As described above, the water container 400 is positioned directly below the water outlet 121 by the attraction force between the first magnetic body M1 and the second magnetic body M2. Therefore, the elastic member 140 may form a firm adhesion along the opening circumference of the water container 400 and seal the water container 400. Alternatively, when the user presses the operation button N, the controller 5 may operate the water pump 4 and the driver 200 in order. That is, when the user presses the operation button N, the water pump 4 is first operated to fill the hydrogen water in the water container 400. Then, the driver 200 is operated so that the hydrogen water discharger 100 is lowered. The elastic member 140 may form a firm adhesion along the opening circumference of the water container 400 and seal the water container 400. When the user presses the operation button N again after the water container 400 is filled with hydrogen water, the controller 5 may operate the driver 200 to raise the hydrogen water discharger 100. The user may then retrieve the water container 400 and drink the hydrogen water immediately or cover the water container 400 to store the hydrogen water.

As shown in FIG. 5, the second magnetic body M2 may be made of an electromagnet. When the user presses the operation button N after seating the water container 400 on the seating surface of the seating plate 320, the controller 5 supplies power to the second magnetic body M2. The water container 400 may slide on the seating surface until the first magnetic body M1 is positioned directly above the second magnetic body M2 by the attraction force between the first magnetic body M1 and the second magnetic body M2. Therefore, the hydrogen water generator 10 according to the present embodiment may automatically move the water container 400 on the seating surface such that the opening of the water container 400 may be located directly below the water outlet 121. FIG. 6 shows the movement of the water container 400 by the attraction force between the first magnetic body M1 and the second magnetic body M2 in various directions.

As shown in FIGS. 3A and 3B, the controller 5 then operates the driver 200 and the water pump 4 in order. That is, when the user presses the operation button N, the controller 5 supplies power to the second magnetic body M2. Then, the hydrogen water discharger 100 is lowered by the operation of the driver 200 so that the elastic member 140 is in close contact with the opening circumference of the water container 400. The elastic member 140 may form a firm adhesion along the opening circumference of the container 400 and seal the water container 400. The controller 5 may stop supplying power to the second magnetic body M2. Thereafter, the water pump 4 is operated to fill the hydrogen water into the water container 400. When the user presses the operation button N again after the water container 400 is filled with hydrogen water, the controller 5 operates the driver 200 to raise the hydrogen water discharger 100. The user may then retrieve the water container 400 and drink the hydrogen water immediately or cover the water container 400 to store the hydrogen water.

FIG. 7 is a partially exploded perspective view of a hydrogen water generator according to another embodiment of the present invention, FIGS. 8 and 9 are partial side cross-sectional views showing a state of use of the hydrogen water generator of FIG. 7.

As shown in FIGS. 7 to 9, in the hydrogen water generator 20 according to another embodiment of the present invention, the water container 400 may first move by an attraction force between a first peripheral magnetic body M1B and a second peripheral magnetic body M2B. After the first movement, a secondary movement of the water container 400 may be performed by an attraction between a first central magnetic body M1A and a second central magnetic body M2A in a multi-stage movement. In the hydrogen water generator 20 according to another embodiment of the present invention, the structure may be the same or similar as the embodiment described with respect to FIG. 4 except for the seating unit 300 and the water container 400. Therefore, the description to follow will focus on the seating unit 300 and the water container 400.

As shown in FIGS. 7 to 9, the seating unit 300 includes a configuration in which when the water container 400 is placed on the seating unit 300, it is disposed below the water outlet 121. The water container 400 is formed with an opening at an upper end thereof to accommodate the hydrogen water falling from the water outlet 121. The water container 400 may be provided with a first magnetic body M1, and the seating unit 300 may be provided with a second magnetic body M2. The first magnetic body M1 may include the first central magnetic body M1A and the first peripheral magnetic body M1B. The first central magnetic body M1A may be mounted at the center of the bottom of the water container 400. The first peripheral magnetic body M1B may be disposed along the circumferential direction around the first central magnetic body M1A. The first central magnetic body M1A and the first peripheral magnetic body M1B may be made of permanent magnets or ferromagnetic bodies.

FIG. 7 shows a first peripheral magnetic body M1B in a form of a ring. The first peripheral magnetic body M1B may be provided along the circumferential direction around the first central magnetic body M1A. The first peripheral magnetic body M1B may be provided in plural. In this case, the first peripheral magnetic body M1B may be disposed to be spaced apart from each other along the circumferential direction with respect to the first central magnetic body M1A. The seating unit 300 may include a seating panel 310 and a seating plate 320. The second magnetic body M2 may be disposed at seating panel 310 and may be disposed below the seating plate 320. The second magnetic body M2 may include a second central magnetic body M2A and a second peripheral magnetic body M2B. The seating plate 320 may a seating surface on which the water container 400 is placed. The water container 400 may be placed anywhere on the upper surface of the seating plate 320. That is, the seating surface may be the entire upper surface of the seating plate 320.

As shown in FIG. 7, a hole or holes through which water may pass down may be formed in the seating plate 320. Thus, even if a user accidentally spills water on the seating plate 320, the water passes through the holes of the seating plate 320 and may be collected on the seating panel 310. The body 7 includes a shielding portion 7C formed higher than the seating panel 310 around the seating panel 310. The shielding portion 7C may prevent the water spilled on the seating plate 320 from overflowing outside of the seating panel 310.

As shown in FIGS. 8 and 9, the second central magnetic body M2A and the second peripheral magnetic body M2B may be made of electromagnets. As shown in FIG. 10A, the second central magnetic body M2A may be mounted on the upper end of the seating panel 310 on the gravity extension line (the center) of the water outlet 121. The second peripheral magnetic body M2B may be provided in plural and mounted on the upper end of the seating panel 310 along the circumferential direction with respect to the second central magnetic body M2A. FIG. 10A shows eight second peripheral magnetic bodies M2B provided and spaced apart from each other along a circumferential direction around the first central magnetic body M1A. The water container 400 may be formed in a cylindrical shape. The first central magnetic body M1A may be mounted at the center of the bottom of the water container 400. The water container 400 may stably receive the water falling from the water outlet 121 when the first central magnetic body M1A is attracted and positioned directly above the second central magnetic body M2A.

As shown in FIG. 8, when the user seats the water container 400 on the seating surface of the seating plate 320 and presses the operation button N, the controller 5 first supplies power to the plurality of second peripheral magnetic bodies M2B. Then, the power supply of the second peripheral magnetic body M2B is stopped, and as shown in FIG. 9, power is supplied to the second central magnetic body M2A. As shown in FIG. 8, when the controller 5 first supplies power to the plurality of second peripheral magnetic bodies M2B, the water container 400 may slide on the seating surface by the attraction force between the first peripheral magnetic bodies M1B and the second peripheral magnetic bodies M2B.

FIGS. 10A, 10B, and 10C are partial plan views illustrating a movement path of the water container of the hydrogen water generator of FIG. 7. FIGS. 10A, 10B, and 10C only show an outline of the seating plate 320 and do not show the holes of the seating plate 320 for easy understanding of the first magnetic body M1, the second magnetic body M2 and the water container 400. In FIGS. 10A, 10B, and 10C, the water container 400 only shows the outline of the bottom of the water container 400.

FIG. 10A shows a state in which the user seats the water container 400 at an edge of the seating surface of the seating plate 320, and FIG. 10B shows a state in which the water container 400 moves by the attraction force between the first peripheral magnetic body M1B and the second peripheral magnetic body M2B. The second peripheral magnetic body M2B may be provided in plural. In the state of FIG. 10B, only a part of the second peripheral magnetic body M2B is positioned directly under the first peripheral magnetic body M1B. As shown in FIG. 10C, the distance between the first central magnetic body M1A and the first peripheral magnetic body M1B is smaller than the distance between the second central magnetic body M2A and the second peripheral magnetic body M2B. If the distance between the first central magnetic body M1A and the first peripheral magnetic body M1B and the distance between the second central magnetic body M2A and the second peripheral magnetic body M2B are the same, in the state of FIG. 10B, the first central magnetic body M1A moves to just above the second central magnetic body M2A. Therefore, the multi-stage movement of the water container 400 may be impossible.

If the distance between the first central magnetic body M1A and the first peripheral magnetic body M1B is greater than the distance between the second central magnetic body M2A and the second peripheral magnetic body M2B, as shown in FIG. 10B the first central magnetic body becomes closer to the second central magnetic body M2A. Therefore, the multi-stage movement distance of the water container 400 is reduced. In the state shown in FIG. 10B, when the controller 5 stops the power supply of the second peripheral magnetic body M2B and supplies power to the second central magnetic body M2A, the water container 400, as shown in FIG. 9, moves on the seating surface by the attraction force between the first central magnetic body M1A and the second central magnetic body M2A. FIG. 10C shows a state in which the water container 400 has moved by the attraction force between the first central magnetic body M1A and the second central magnetic body M2A. Since only one first central magnetic body M1A and one second central magnetic body M2A are provided, the first central magnetic body M1A is positioned directly above the second central magnetic body M2A in FIG. 10C.

That is, in the hydrogen water generator 20 according to another embodiment of the present invention, the water container 400 moves first by magnetic attraction between the first peripheral magnetic body M1B and the second peripheral magnetic body M2B, and then secondarily moved by the attraction force between the first central magnetic body M1A and the second central magnetic body M2A, and thereby the multi-stage moving structure is formed. Therefore, there is an advantage in that the distance for moving the water container 400 is increased so that the opening of the water container 400 is located directly below the water outlet 121.

Referring to FIGS. 3A and 3B, the controller 5 then operates the driver 200 and the water pump 4 in order. That is, when the user presses the operation button N, the controller 5 sequentially supplies power to the second peripheral magnetic body M2B and to the second central magnetic body M2A. Then, the hydrogen water discharger 100 is lowered by the operation of the driver 200 so that the elastic member 140 is in close contact with the opening circumference of the water container 400. Since the water container 400 is located directly below the water outlet 121, the elastic member 140 may form a firm adhesion along the opening circumference of the water container 400 and seal the water container 400. The controller 5 stops supplying power to the second central magnetic material M2A. Thereafter, the water pump 4 is operated to fill the hydrogen water into the water container 400. When the user presses the operation button N again after the water container 400 is filled with hydrogen water, the controller 5 operates the driver 200 to raise the hydrogen water discharger 100. The user may then retrieve the water container 400 and drink the hydrogen water immediately or cover the water container 400 to store the hydrogen water.

FIG. 11 is partially exploded perspective view of the hydrogen water generator according to another embodiment of the present invention, FIG. 12 is a perspective view of the hydrogen water generator according to the another embodiment of the present invention, and FIG. 13 is a bottom perspective view of a rolling plate of the hydrogen water generator of FIG. 11.

As shown in FIGS. 11 and 12, the hydrogen water generator 30 according to another embodiment of the present invention includes the first magnetic body M1 and the second magnetic body M2 in a state in which the water container 400 is seated on the rolling plate 330 may be moved by the attraction force between the magnetic bodies. In the hydrogen water generator 30 according to another embodiment of the present invention, the structure may be the same or similar as the embodiment described with respect to FIG. 4 except for the seating unit 300. Therefore, the description to follow will focus on the seating unit 300.

Referring to FIGS. 11 and 12, the seating unit 300 includes a configuration in which when the water container 400 is placed on the seating unit 300, it is disposed below the water outlet 121. The seating unit 300 may include a seating panel 310 and a rolling plate 330. The seating panel 310 may be provided with the second magnetic body M2, and may define a plane on which the rolling plate 330 moves. The rolling plate 330 may be configured to move on the seating panel 310, and may form the seating surface on which the water container 400 is placed. The water container 400 may be placed anywhere on the upper surface of the rolling plate 330. That is, the seating surface may be the entire upper surface of the rolling plate 330.

A ball or a wheel 333 may be provided below the rolling plate 330. The ball or the wheel 333 may rotate between the rolling plate 330 and the seating panel 310 when the rolling plate 330 moves to smoothly move the rolling plate 330. The rolling plate 330 may formed in a substantially plate shape. The upper surface of the seating panel 310 may form a plane extending from the radius of the rolling plate 330 around the second magnetic body M2. Therefore, the rolling plate 330 may move on the seating panel 310 when an external force is applied. The rolling plate 330 may be provided with a third magnetic body M3 forming an attractive force with the second magnetic body M2. The third magnetic body M3 may be mounted at the center of the rolling plate 330. The third magnetic body M3 is made of ferromagnetic body or permanent magnet. The rolling plate 330 may be formed with a hole or holes through which water may pass down. Thus, even if a user accidentally spills water on the rolling plate 330, the water passes through the holes of the rolling plate 330 and may be collected on the seating panel 310. The body 7 may include a shielding portion 7C formed higher than the seating panel 310 around the seating panel 310. The shielding portion 7C may prevent the water spilled on the rolling plate 330 from overflowing outside of the seating panel 310.

The water container 400 may be provided with a first magnetic body M1. The seating panel 310 may be provided with a second magnetic body M2 that forms an attraction force with the first magnetic body M1. The water container 400 is formed with an opening at an upper end thereof to accommodate the hydrogen water falling from the water outlet 121. The first magnetic body M1 may be mounted at the center of the bottom of the water container 400. The first magnetic body M1 may be made of ferromagnetic or permanent magnet.

FIGS. 14 to 17 are partial side cross-sectional views showing a state of use of the hydrogen water generator of FIG. 12.

As shown in FIG. 14 and FIG. 15, the second magnetic body M2 may be mounted on the upper end portion of the seating panel 310 corresponding to the gravity extension line (the center) of the water outlet 121. The water container 400 may be formed in a cylindrical shape. The first magnetic body M1 may be mounted at the center of the bottom of the water container 400. The water container 400 may stably receive the water falling from the water outlet 121 when the first magnetic body M1 is attracted and positioned directly above the second magnetic body M2.

As shown in FIGS. 14 and 15, the second magnetic body M2 may be made of an electromagnet. When the user presses the operation button N after seating the water container 400 on the seating surface of the rolling plate 330, the controller 5 first supplies power to the second magnetic body M2. The rolling plate 330 slides on the seating panel 310 by the attraction between the first magnetic body M1 and the second magnetic body M2 until the first magnetic body M1 is positioned directly above the second magnetic body M2.

That is, in the hydrogen water generator 30 according to another embodiment of the present invention, after the user places the water container 400 on the seating surface of the rolling plate 330, the first magnetic body M1 and the second magnetic body M2 form an attraction force to each other. Therefore, the water container 400 may be automatically moved so that the opening of the water container 400 is located directly below the water outlet 121. The opening of the water container 400 may be positioned directly below the water outlet 121 by the rolling movement of the rolling plate 330. The water container 400 may not move on the rolling plate 330. Therefore, in the hydrogen water generator 30 according to another embodiment of the present invention, even if the first magnetic body M1 and the second magnetic body M2 form a smaller attraction force than the embodiment of FIG. 7, there is an advantage that the rolling of the rolling plate may move the water container 400 even with the smaller attraction.

FIGS. 18A and 18B are partial plan views showing the movement of the rolling plate 330 due to the attraction between the first magnetic body M1 and the second magnetic body M2. Referring to FIGS. 3A and 3B, the controller 5 operates the driver 200 and the water pump 4 in order. That is, when the user presses the operation button N, the controller 5 first supplies power to the second magnetic body M2. Then, the hydrogen water discharger 100 is lowered and the elastic member 140 is in close contact with the opening circumference of the water container 400. Thereafter, the water pump 4 is operated to fill the hydrogen water into the water container 400. The controller 5 stops supplying power to the second magnetic body M2. Since the water container 400 is positioned directly below the water outlet 121 by the attraction force between the first magnetic body M1 and the second magnetic body M2, the elastic member 140 may form a strong adhesion along the opening circumference of the container 400 and seal the water container 400. When the user presses the operation button N again after the water container 400 is filled with hydrogen water, the controller 5 operates the driver 200 to raise the hydrogen water discharger 100. The user may then retrieve the water container 400 and drink the hydrogen water immediately or cover the water container 400 to store the hydrogen water.

FIGS. 19A and 19B are partial plan views showing the movement path of the rolling plate of the hydrogen water generator of FIG. 12.

FIGS. 16 and 19A illustrate the position of the rolling plate 330 on the seating panel 310 after the user retrieves the water container 400. The controller may operate the driver 200 to raise the hydrogen water discharger 100, and after a predetermined time has elapsed, the controller 5 supplies power to the second magnetic body M2 again. As shown in FIG. 17 and FIG. 19B, the rolling plate 330 slides on the seating panel 310 by the attraction between the second magnetic body M2 and the third magnetic body M3 until the third magnetic body M3 is positioned directly above the second magnetic body M2. That is, in the hydrogen water generator 30 according to another embodiment of the present invention, after the user retrieves the water container 400, the rolling plate 330 may again be located directly below the water outlet 121 by the attraction force of the second magnetic body M2 and the third magnetic body M3 if the rolling plate 330 is not located directly below the water outlet 121.

Referring to FIGS. 14 and 16, when both the first magnetic body M1 and the third magnetic body M3 are made of permanent magnets, the first magnetic body M1 and the third magnetic body M3 may form a repulsive force with each other. When the first magnetic body M1 and the third magnetic body M3 form a repulsive force with each other, the user may easily retrieve the water container 400 from the rolling plate 330. The controller 5 may change the polarity of the second magnetic body M2 by changing the direction of the current supplied to the second magnetic body M2. That is, in the second magnetic body M2, the electrode may be reversed to selectively form an attraction force with the first magnetic body M1 or the third magnetic body M3. When the first magnetic body M1 is provided as a permanent magnet having a magnet density higher than that of the third magnetic body M3, the interference of the third magnetic body M3 when the attraction force between the first magnetic body M1 and the second magnetic body M2 is formed, may be suppressed.

FIG. 20 is a partial exploded perspective view of a hydrogen water generator according to another embodiment of the present invention, FIG. 21 is a perspective view of the hydrogen water generator according to the another embodiment of the present invention, and FIG. 22 is a bottom perspective view of a rolling plate of the hydrogen water generator of FIG. 20.

As shown in FIG. 20 and FIG. 21, the hydrogen water generator 40 according to another embodiment of the present invention includes a water container 400 having an attraction force between the first peripheral magnetic body M1B and the second peripheral magnetic body M2B. As a result, a multi-stage moving structure may be formed which is secondarily moved by an attraction force between the first central magnetic body M1A and the second central magnetic body M2A. In the hydrogen water generator 40 according to another embodiment of the present invention, the structure may be the same or similar as the embodiment described with respect to FIG. 7 except for the seating unit 300. Therefore, the description to follow will focus on the seating unit 300.

As shown in FIG. 20 and FIG. 21, the seating unit 300 includes a configuration in which when the water container 400 is placed on the seating unit 300, it is disposed below the water outlet 121. The seating unit 300 includes a seating panel 310 and a rolling plate 330. The water container 400 may be provided with a first magnetic body M1, and the seating panel 310 may be provided with a second magnetic body M2. The seating panel 310 may be a plane on which the rolling plate 330 moves. The first magnetic body M1 may include the first central magnetic body M1A and the first peripheral magnetic body M1B. The first central magnetic body M1A may be mounted at the center of the bottom of the container 400. The first peripheral magnetic body M1B may be disposed along the circumferential direction around the first central magnetic body M1A. The first central magnetic body M1A and the first peripheral magnetic body M1B may be made of permanent magnets or ferromagnetic bodies.

FIG. 20 shows a first peripheral magnetic body M1B formed in a ring shape. The first peripheral magnetic body M1B may be provided along the circumferential direction around the first central magnetic body M1A. The first peripheral magnetic body M1B may be provided in plural. In this case, the first peripheral magnetic body M1B may be disposed to be spaced apart from each other along the circumferential direction with respect to the first central magnetic body M1A. The seating panel 310 may be a configuration in which the second magnetic body M2 is mounted and disposed below the rolling plate 330. The second magnetic body M2 may include a second central magnetic body M2A and a second peripheral magnetic body M2B. As shown in FIG. 23, the second central magnetic body M2A and the second peripheral magnetic body M2B may be made of electromagnets.

As shown in FIG. 20, the second central magnetic body M2A is mounted on an upper end portion of the seating panel 310 on the gravity extension line (the center) of the water outlet 121. The second peripheral magnetic body M2B may be provided in plural and mounted on the upper end of the mounting panel 310 along the circumferential direction with respect to the second central magnetic body M2A. In FIG. 20, eight second peripheral magnetic bodies M2B are provided to be spaced apart from each other along the circumferential direction around the first central magnetic body M1A. As shown in FIG. 21, the rolling plate 330 may be configured to move on the seating panel 310, and may include a central rolling plate 331 and a peripheral rolling plate 332. The central rolling plate 331 and the peripheral rolling plate 332 may form a seating surface on which the water container 400 is placed. The water container 400 may be placed anywhere on the upper surface of the central rolling plate 331 and the peripheral rolling plate 332. That is, the seating surface may be the entire upper surface of the central rolling plate 331 and the peripheral rolling plate 332.

As shown in FIG. 22, a ball or a wheel 333 may be provided below the central rolling plate 331 and the peripheral rolling plate 332. The ball or the wheel 333 rotates between the rolling plate 330 and the seating panel 310 when the center rolling plate 331 and the peripheral rolling plate 332 move, to smoothly move the center rolling plate 331 and the peripheral rolling plate 332. The central rolling plate 331 may be formed in a substantially plate shape. The peripheral rolling plate 332 may be formed in a ring shape surrounding the central rolling plate 331. The inner side of the peripheral rolling plate 332 may form a radius larger than the outer side of the central rolling plate 331. The upper surface of the seating panel 310 may form a plane extending from the outside of the peripheral rolling plate 332 with respect to the second magnetic body M2. Accordingly, the peripheral rolling plate 332 may move on the seating panel 310 when an external force is applied.

As shown in FIG. 22, the central rolling plate 331 may be provided with a third central magnetic body M3A forming an attractive force with the second central magnetic body M2A. The third central magnetic body M3A may be mounted at the center of the rolling plate 330. The peripheral rolling plate 332 is provided with a third peripheral magnetic body M3B forming an attractive force with the second peripheral magnetic body M2B. The third central magnetic body M3A and the third peripheral magnetic body M3B may be made of ferromagnetic or permanent magnets. As shown in FIG. 21, even if a user accidentally spills water on the rolling plate 330, the water may be collected between the center rolling plate 331 and the peripheral rolling plate 332 and collected at the seating panel 310. The body 7 may include a shielding portion 7C formed higher than the seating panel 310 around the seating panel 310. The shielding portion 7C may prevent the water spilled on the rolling plate 330 from overflowing outside of the seating panel 310.

FIGS. 23 to 28 are partial side cross-sectional views showing a state of use of the hydrogen water generator of FIG. 21.

As shown in FIG. 23, the second magnetic body M2 may be made of an electromagnet. When the user presses the operation button N after seating the water container 400 on the seating surface of the rolling plate 330, the controller 5 first supplies power to the plurality of second peripheral magnetic bodies M2B, and then after the controller 5 stops supplying power to the second peripheral magnetic bodies M2B, power is supplied to the second central magnetic material M2A. As shown in FIG. 24, when the controller 5 first supplies power to the plurality of second peripheral magnetic bodies M2B, the central rolling plate 331 and the peripheral rolling plate 332 may slide on the upper surface of the seating panel 310 by the attraction of the first peripheral magnetic body M1B and the second peripheral magnetic body M2B.

FIGS. 29A, 29B, and 29C are partial plan views showing the movement paths of the water container and the rolling plate of the hydrogen water generator of FIG. 21.

FIG. 29A shows a state in which the user places the water container 400 on the edge of the seating surface of the rolling plate 330. FIG. 29B shows a state in which the water container 400 and the rolling plate 330 are moved by the attraction force between the first peripheral magnetic body M1B and the second peripheral magnetic body M2B. The second peripheral magnetic body M2B is provided in plural. In the state of FIG. 29B, only a part of the second peripheral magnetic body M2B is positioned directly under the first peripheral magnetic body M1B. As shown in FIG. 29C, the distance between the first central magnetic body M1A and the first peripheral magnetic body M1B is smaller than the distance between the second central magnetic body M2A and the second peripheral magnetic body M2B. If the distance between the first central magnetic body M1A and the first peripheral magnetic body M1B and the distance between the second central magnetic body M2A and the second peripheral magnetic body M2B are equal to each other, the first central magnetic body M1A moves to just above the second central magnetic body M2A. Therefore, the multi-stage movement of the water container 400 may be impossible.

If the distance between the first central magnetic body M1A and the first peripheral magnetic body M1B is greater than the distance between the second central magnetic body M2A and the second peripheral magnetic body M2B, as shown in FIG. 29B, the first central magnetic body M1A becomes closer to the second central magnetic body M2A. Therefore, the multi-stage movement distance of the water container 400 is reduced. In the state shown in FIG. 24, when the controller 5 stops supplying power to the second peripheral magnetic body M2B and supplies power to the second central magnetic body M2A, the water container 400, as shown in FIG. 25, moves on the seating surface by the attraction force between the first central magnetic body M1A and the second central magnetic body M2A. During this process, when the peripheral rolling plate 332 contacts the body 7 and further rolling movement is restricted, the water container 400 moves together with the central rolling plate 331. In this process, even if the central rolling plate 331 is in contact with the peripheral rolling plate 332 and further rolling movement is restricted, the water container 400 may slide and move on the seating surface. FIG. 29C illustrates a state in which the water container 400 moves by the attraction force between the first central magnetic body M1A and the second central magnetic body M2A. Only one first central magnetic body M1A and one second central magnetic body M2A are provided. Accordingly, in the state of FIG. 29C, the first central magnetic body M1A is positioned directly above the second central magnetic body M2A.

In the hydrogen water generator 40 according to another embodiment of the present invention, the water container 400 moves first by a attraction force between the first and second peripheral magnetic bodies M1B and M2B. A multi-stage moving structure that is secondarily moved by the attraction force between the magnetic body M1A and the second central magnetic body M2A may be formed. Therefore, there may be an advantage in that the distance for moving the water container 400 is increased so that the opening of the water container 400 may be located directly below the water outlet 121. In addition, even if the first magnetic body M1 and the second magnetic body M2 forms a smaller attraction force than the embodiment of FIG. 20, in the hydrogen water generator 40 according to another embodiment of the present invention, the movement of the water container 400 may be made by the multi-stage rolling movement.

Referring to FIGS. 3A and 3B, when the user presses the operation button N, the controller 5 operates the driver 200 and the water pump 4 in order. The controller 5 sequentially supplies power to the second peripheral magnetic body M2B and the second central magnetic body M2A. Then, the hydrogen water discharger 100 is lowered by the operation of the driver 200 so that the elastic member 140 is in close contact with the opening circumference of the water container 400. Since the water container 400 is located directly below the water outlet 121, the elastic member 140 may form a firm adhesion along the opening circumference of the container 400 and seal the water container 400. The controller 5 stops supplying power to the second central magnetic body M2A. Thereafter, the water pump 4 is operated to fill the hydrogen water into the water container 400. When the user presses the operation button N again after the water container 400 is filled with hydrogen water, the controller 5 operates the driver 200 to raise the hydrogen water discharger 100. The user may retrieve the water container 400 and drink the hydrogen water immediately or may cover the water container 400 to store the hydrogen water.

FIGS. 30A, 30B, and 30C are partial plan views showing movement paths of the rolling plate of the hydrogen water generator of FIG. 21.

FIG. 26 and FIG. 30A shows positions of the central rolling plate 331 and the peripheral rolling plate 332 on the seating panel 310 after the user retrieves the water container 400. When the controller 5 operates the driver 200 to raise the hydrogen water discharger 100 and a predetermined time elapses, the controller 5 first supplies power to the plurality of second peripheral magnetic bodies M2B. Then, after the power supply of the second peripheral magnetic body M2B is stopped, power is supplied to the second central magnetic body M2A.

Referring to FIG. 27 and FIG. 30B, when the controller 5 first supplies power to the second peripheral magnetic body M2B, the peripheral rolling plate 332 slides on the seating panel 310 by the attraction force between the second peripheral magnetic body M2B and the third peripheral magnetic body M3B. The peripheral rolling plate 332 is moved until the third peripheral magnetic body M3B is located directly above the second peripheral magnetic body M2B. In this case, the central rolling plate 331 may be pushed by the peripheral rolling plate 332 to move in the direction in which the third central magnetic body M3A may be close to the second central magnetic body M2A.

Referring to FIGS. 28 and 30C, when the controller 5 stops supplying power to the second peripheral magnetic body M2B and supplies power to the second central magnetic body M2A, the central rolling plate 331 slides and moves on the seating panel 310 by the attraction force between the magnetic body M2A and the third central magnetic body M3A. The central rolling plate 331 may be moved until the third central magnetic body M3A is located directly above the second central magnetic body M2A.

In the hydrogen water generator 40 according to another embodiment of the present invention, after the user retrieves the water container 400, the second magnetic body M2 and the third magnetic body M3 may form an attraction force with each other. Therefore, there may be an advantage that the rolling plate 330 may be automatically moved so that the rolling plate 330 is located directly below the water outlet 121.

Referring FIGS. 23 and 26, when both the first magnetic body M1 and the third magnetic body M3 are made of permanent magnets, the first magnetic body M1 and the third magnetic body M3 form a repulsive force with each other. When the first magnetic body M1 and the third magnetic body M3 form a repulsive force with each other, the user may easily lift the water container 400 from the rolling plate 330. The controller 5 may change the polarity of the second magnetic body M2 by changing the direction of the current supplied to the second magnetic body M2. That is, in the second magnetic body M2, the electrode may be reversed to selectively form an attraction force with the first magnetic body M1 or the third magnetic body M3. When the first magnetic body M1 is provided as a permanent magnet having a magnet density higher than that of the third magnetic body M3, the interference of the third magnetic body M3 when the attraction between the first magnetic body M1 and the second magnetic body M2 is formed, may be suppressed.

While preferred embodiments of the present invention have been described and illustrated above, the present invention is not limited to the described embodiments, and those skilled in the art can variously change to other specific embodiments without departing from the spirit and scope of the present invention. It will be understood that modifications and variations are possible. Therefore, the scope of the present invention should not be defined by the described embodiments, but should be determined by the technical spirit described in the claims.

What is claimed is:

1. A hydrogen water generator comprising:
   a hydrogen water discharger including a water outlet;
   a driver that lowers the hydrogen water discharger;
   a controller;
   an operation button;
   a seating unit disposed under the water outlet and forming a seating surface;
   a water container seatable on the seating surface and including an opening at an upper end of the water container, and a first magnetic body at a lower end of the water container; and
   the seating unit including a second magnetic body,
   wherein when the water container is seated on the seating surface, the first magnetic body and the second magnetic body are attractable to each other to position the water container with respect to the water outlet,
   wherein the second magnetic body is an electromagnet,
   wherein when the second magnetic body is supplied with power after the water container is seated on the seating surface, the water container slides on the seating surface until the first magnetic body is positioned directly above the second magnetic body by an attraction force between the first magnetic body and the second magnetic body,
   wherein when the controller determines that the operation button is pressed, power is supplied to the second magnetic body to cause the water container to slide into position below the hydrogen water discharger, and then the controller is configured to operate the driver to lower the hydrogen water discharger.

2. The hydrogen water generator of claim 1, wherein the first magnetic body is a permanent magnet or a ferromagnetic body.

3. The hydrogen water generator of claim 1, wherein the seating unit includes a seating panel and a rolling plate on which the water container is seatable.

4. The hydrogen water generator of claim 3, further comprising a plurality of balls or wheels interposed between the rolling plate and the seating panel.

5. The hydrogen water generator of claim 3, wherein the rolling plate includes a third magnetic body and the seating panel includes the second magnetic body, and the second magnetic body and the third magnetic body are attractable to each other to roll the rolling plate with respect to the seating panel.

6. The hydrogen water generator of claim 5, wherein the third magnetic body is a permanent magnet or a ferromagnetic body.

7. The hydrogen water generator of claim 5,
   wherein the controller is configured to supply power to the second magnetic body such that the second magnetic body forms an attraction force with the first magnetic body to position the water container under the water outlet, and the controller is configured to supply power to the second magnetic body such that the second magnetic body forms an attraction force with the third magnetic body to move the rolling plate until the third magnetic body is positioned above the second magnetic body.

8. The hydrogen water generator of claim 7,
wherein the first magnetic body includes
a first central magnetic body, and
at least one first peripheral magnetic body disposed along a circumferential direction with respect to the first central magnetic body; and
the second magnetic body includes
a second central magnetic body, and
at least one second peripheral magnetic body disposed along a circumferential direction with respect to the second central magnetic body.

9. The hydrogen water generator of claim 8, wherein the controller is configured to supply the current to the second central magnetic body after supplying the current to the at least one second peripheral body, and the water container is moved by an attraction force between the at least one first peripheral magnetic body and the at least one second peripheral body, and then the water container is moved by an attraction force between the first central magnetic body and the second central magnetic body.

10. The hydrogen water generator of claim 9, wherein a distance between the first central magnetic body and the at least one first peripheral magnetic body is smaller than a distance between the second central magnetic body and the at least one second peripheral magnetic body.

11. The hydrogen water generator of claim 5,
wherein the third magnetic body includes
a third central magnetic body, and
at least one third peripheral magnetic body disposed along a circumferential direction with respect to the third central magnetic body.

12. The water hydrogen generator of claim 11,
wherein the rolling plate includes
a central rolling plate and a peripheral rolling plate surrounding the central rolling plate,
the central rolling plate including the third central magnetic body, and
the peripheral rolling plate including the at least one third peripheral magnetic body, and
the peripheral rolling plate forming a moving boundary of the central rolling plate on the seating panel.

13. The water hydrogen generator of claim 12, wherein the controller is configured to supply the current to the second central magnetic body after supplying the current to the at least one second peripheral magnetic body, wherein the peripheral rolling plate is moved by an attraction force between the at least one third peripheral magnetic body and the at least one second peripheral magnetic body, and then the central rolling plate is moved by an attraction force between the third central magnetic body and the second central magnetic body.

14. The hydrogen generator of claim 13, wherein an attraction between the second peripheral magnetic body and the third peripheral magnetic body moves the peripheral rolling plate on the seating panel, and the peripheral rolling plate moves the central rolling plate such that the third magnetic body moves toward the second central magnetic body.

15. The hydrogen water generator of claim 7, wherein the first magnetic body and the third magnetic body are permanent magnets, and the controller is configured to change a polarity of the second magnetic body such that the second magnetic body and the third magnetic body form a repulsive force with each other.

16. The hydrogen water generator of claim 7, wherein the controller is configured to supply the current to the second magnetic body when the water container is removed from the rolling plate.

17. The hydrogen water generator of claim 1, wherein the hydrogen water discharger is movable to cover the opening of the upper end of the water container when the water container is positioned under the water outlet.

18. An appliance comprising a body that includes the hydrogen water generator of claim 1.

* * * * *